United States Patent
Toopran et al.

(10) Patent No.: US 9,484,025 B2
(45) Date of Patent: Nov. 1, 2016

(54) CONFIGURING DYNAMIC CUSTOM VOCABULARY FOR PERSONALIZED SPEECH RECOGNITION

(71) Applicant: TOYOTA JIDOSHA KABUSHIKI KAISHA, Toyota-shi, Aichi-ken (JP)

(72) Inventors: Divya Sai Toopran, Sunnyvale, CA (US); Vinuth Rai, San Jose, CA (US); Rahul Parundekar, Sunnyvale, CA (US)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 243 days.

(21) Appl. No.: 14/054,763

(22) Filed: Oct. 15, 2013

(65) Prior Publication Data

US 2015/0106096 A1 Apr. 16, 2015

(51) Int. Cl.
  *G10L 15/193* (2013.01)
  *G10L 15/22* (2006.01)

(52) U.S. Cl.
  CPC ........ *G10L 15/193* (2013.01); *G10L 2015/228* (2013.01)

(58) Field of Classification Search
  CPC . G10L 15/22; G10L 15/1815; G10L 15/197; G06F 17/28; G06F 17/3087; G06F 3/167; G06F 17/30386; G06F 17/30595; G06F 17/30616; G06F 17/3053; G06F 17/30675; G06F 17/273; G06F 17/276; G06F 17/30684; G06F 3/0237; G06F 17/27; G06F 17/2735; G06F 17/30643; G06F 17/30654
  See application file for complete search history.

(56) References Cited

U.S. PATENT DOCUMENTS 6,230,132 B1  5/2001  Class et al.
8,326,627 B2 *  12/2012  Kennewick ........ G06Q 30/0261 704/255
2003/0125869 A1 *  7/2003  Adams, Jr. ............. G01C 21/20 701/532
2006/0041378 A1  2/2006  Cheng et al.
2006/0173618 A1  8/2006  Eyer et al.
2009/0150156 A1 *  6/2009  Kennewick ........ G06Q 30/0261 704/257
2012/0016678 A1  1/2012  Gruber et al.
2012/0089615 A1  4/2012  James et al.

(Continued)

FOREIGN PATENT DOCUMENTS

CA      2440463 A1    10/2002
JP     2011210041     10/2011

OTHER PUBLICATIONS

Parundekar, et al., "Learning Driver Preferences of POIs Using a Semantic Web Knowledge System." The Semantic Web: Research and Applications. Springer Berlin Heidelberg, 2012. (15 pages).

(Continued)

*Primary Examiner* — Matthew Barker
(74) *Attorney, Agent, or Firm* — Patent Law Works LLP

(57) ABSTRACT

The disclosure includes a system and method for configuring custom vocabularies for personalized speech recognition. The system includes a processor and a memory storing instructions that when executed cause the system to: detect a provisioning trigger event; determine a state of a journey associated with a user based on the provisioning trigger event; determine one or more interest places based on the state of the journey; populate a place vocabulary associated with the user using the one or more interest places; filter the place vocabulary based on one or more place filtering parameters; and register the filtered place vocabulary for the user.

33 Claims, 25 Drawing Sheets

(56) References Cited

U.S. PATENT DOCUMENTS

| | | | |
|---|---|---|---|
| 2013/0103300 A1* | 4/2013 | Rakthanmanon | G01C 21/3484 701/408 |
| 2014/0041055 A1* | 2/2014 | Shaffer | G06Q 10/10 726/28 |
| 2014/0088961 A1* | 3/2014 | Woodward | G10L 15/22 704/235 |
| 2014/0316784 A1* | 10/2014 | Bradford | G10L 15/18 704/245 |
| 2015/0100240 A1* | 4/2015 | Toopran | G01C 21/3608 701/539 |

OTHER PUBLICATIONS

Van Setten, et al., "Context-Aware Recommendations in the Mobile Tourist Application COMPASS." Adaptive Hypermedia and Adaptive Web-Based Systems. Springer Berlin Heidelberg, 2004 (10 pages).

Non-Final Office Action mailed Jul. 17, 2015, in U.S. Appl. No. 14/049,151, filed Oct. 8, 2013 (26 pages).

* cited by examiner

CONFIGURING DYNAMIC CUSTOM VOCABULARY FOR PERSONALIZED SPEECH RECOGNITION

BACKGROUND

The specification relates to speech recognition. In particular, the specification relates to a system for configuring custom vocabularies for speech recognition.

A user can issue a speech query to an automatic speech recognition system and receive a query result from the speech recognition system. However, the speech recognition system may have difficulty in recognizing some terms in the speech query correctly. For example, the speech recognition system may be unable to interpret a query for a place that is located near another location or an intersection. In another example, the speech recognition system may not recognize terms that have a personal meaning relevant to the user. Therefore, the query result received from the speech recognition system may not match the speech query or the system may be unable to interpret the query at all.

Existing systems may not account for whether the user is about to embark on a journey or query for direction information, and thus may not have the most pertinent or fresh user contact, location, or point of interest information available for use when recognizing user utterance.

In addition, some existing speech-based navigational systems are limited to using data stored locally on the device and do not include the most up-to-date or relevant data associated with the user. For instance, some systems only rely on a local contacts database and do not take into account the most recent communications that the user may have had, for instance, on a social network or via an instant messaging program. These systems also often do not account for the current geo-location of the user and whether the user's contacts or locations that the user is interested in are located near to that geo-location.

Some speech recognition systems may allow users to register a finite size of vocabulary in order to prevent the system from slowing down. However, if a large set of vocabulary is registered with these speech recognition systems, then the processing speed of speech recognition may be slowed down and the recognition data may possibly be corrupted with noisy data. As a result, the accuracy of these speech recognition system can be compromised.

SUMMARY

According to one innovative aspect of the subject matter described in this disclosure, a system for configuring custom vocabularies for personalized speech recognition includes a processor and a memory storing instructions that, when executed, cause the system to: detect a provisioning trigger event; determine a state of a journey associated with a user based on the provisioning trigger event; determine one or more interest places based on the state of the journey; populate a place vocabulary associated with the user using the one or more interest places; filter the place vocabulary based on one or more place filtering parameters; and register the filtered place vocabulary for the user.

According to another innovative aspect of the subject matter described in this disclosure, a system for configuring custom vocabularies for personalized speech recognition includes a processor and a memory storing instructions that, when executed, cause the system to: detect a provisioning trigger event; determine a state of a journey associated with a user based on the provisioning trigger event; receive contact data describing one or more contacts associated with a user; receive social graph data describing a social graph associated with the user; receive location data associated with the user; populate a contact vocabulary associated with the user based on the contact data, the social graph data, contact information associated with the location data and the state of the journey; filter the contact vocabulary based on one or more contact filtering parameters; and register the filtered contact vocabulary for the user.

According to another innovative aspect of the subject matter described in this disclosure, a system for configuring custom vocabularies for personalized speech recognition includes a processor and a memory storing instructions that, when executed, cause the system to: detect a provisioning trigger event; determine a state of a journey associated with a user based on the provisioning trigger event; receive content data describing one or more content items; receive data describing one or more content sources; populate a content vocabulary associated with a user based on the content data, the one or more content sources and the state of the journey; filter the content vocabulary based on one or more content filtering parameters; and register the filtered content vocabulary for the user.

In general, another innovative aspect of the subject matter described in this disclosure may be embodied in methods that include: detecting a provisioning trigger event; determining a state of a journey associated with a user based on the provisioning trigger event; determining one or more interest places based on the state of the journey; populating a place vocabulary associated with the user using the one or more interest places; filtering the place vocabulary based on one or more place filtering parameters; and registering the filtered place vocabulary for the user.

Other aspects include corresponding methods, systems, apparatus, and computer program products for these and other innovative aspects.

These and other implementations may each optionally include one or more of the following features. For instance, the operations include: receiving a speech command from the user; recognizing one or more custom place terms in the speech command based on the registered place vocabulary; sending data describing the speech command that includes the one or more custom place terms; receiving a result that matches the speech command including the one or more custom place terms; receiving navigation data; processing the navigation data to identify a travel route; determining one or more road names associated with the travel route; determining one or more landmarks associated with the travel route; populating the place vocabulary further based on the one or more stop points, the one or more landmarks and the one or more road names; receiving social network data associated with the user; determining the one or more interest places further based on location data included in the social network data; receiving search data associated with the user; determining the one or more interest places further based on the search data; receiving contacts data associated with the user; determining the one or more interest places further based on location data in the contacts data; receiving search data associated with the user; and determining the one or more interest places further based on the search data.

For instance, the features include: the one or more place filtering parameters including a first location associated with the user; determining a coverage radius based on the first location; determining a coverage range using the coverage radius and the first location; generating the filtered place vocabulary that includes one or more custom place terms corresponding to one or more second locations within the coverage range; the journey including a future journey; the state of the journey including a journey start time for the future journey; and the place vocabulary being populated and registered before the journey start time.

The technology described in this disclosure is particularly advantageous in a number of respects. To reduce the size of the vocabulary, the technology is capable of intelligently determining only necessary sets of custom vocabularies using a number of unique factors. The technology can create custom vocabularies for a user and register the custom vocabularies with a speech engine. The implementation of custom vocabularies can enhance accuracy of speech recognition and create a personalized and valuable experience to the user. For example, the technology is capable of identifying and implementing speech queries that include location data near one or more known places such as a location, a point of interest, an intersection, etc. In another example, without manually inputting personal information into a client device, the user can issue a personalized speech command and receive a result that matches the personalized speech command. The technology is also capable of filtering the custom vocabularies based on one or more filtering parameters to restrict the sizes of the custom vocabularies, which can prevent the system from slowing down in speech recognition and allows the technology to achieve one or more of: faster speech recognition; improvement on accuracy of speech recognition; better learning of the user's preferences; and more personalized experience provided to the user. It should be understood that the foregoing advantages are provided by way of example and the technology may have numerous other advantages and benefits.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Overview

Figure 1:
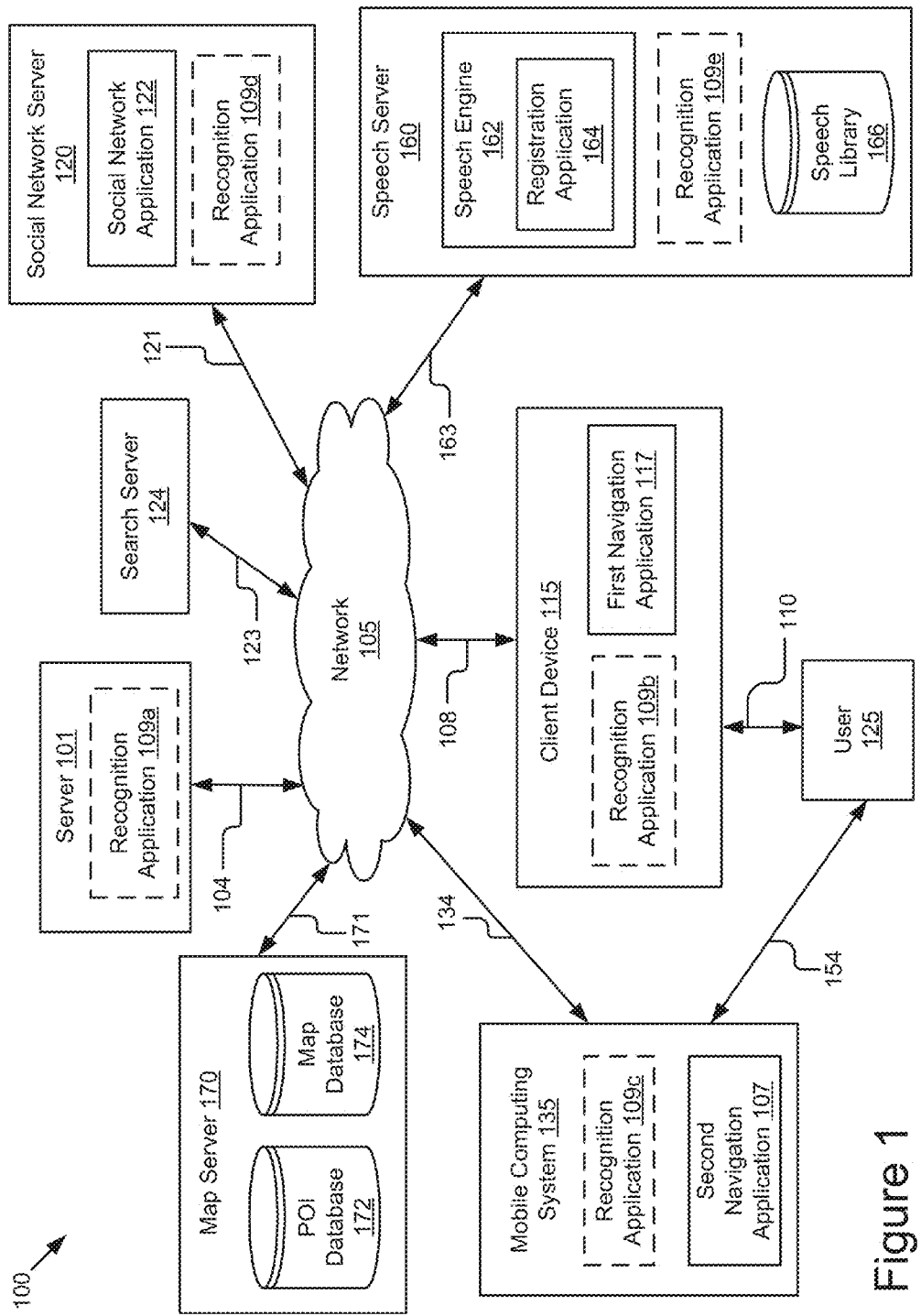
FIG. 1 is a block diagram illustrating an example system for configuring custom vocabularies for personalized speech recognition.

FIG. 1 illustrates a block diagram of a system 100 for configuring custom vocabularies for personalized speech recognition according to some embodiments. The illustrated system 100 includes a server 101, a client device 115, a mobile computing system 135, a search server 124, a social network server 120, a map server 170 and a speech server 160. The entities of the system 100 are communicatively coupled via a network 105.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or includes portions of a telecommunications network for sending data in a variety of different communication protocols. In some embodiments, the network 105 includes Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the server 101, the client device 115, the mobile computing system 135, the search server 124, the social network server 120, the map server 170 and the speech server 160, in practice one or more networks 105 can be connected to these entities.

In some embodiments, the recognition application 109a is operable on the server 101, which is coupled to the network 105 via signal line 104. The server 101 can include a hardware and/or virtual server that includes a processor, a memory and network communication capabilities. In some embodiments, the server 101 can send and receive data to and from one or more of the search server 124, the social network server 120, the speech server 160, the client device 115, the map server 170 and/or the mobile computing system 135. Although FIG. 1 illustrates one server 101, the system 100 can include one or more servers 101.

In some embodiments, the recognition application 109b is operable on the client device 115, which is connected to the network 105 via signal line 108. In some embodiments, the client device 115 can send and receive data to and from one or more of the server 101, the search server 124, the social network server 120, the speech server 160, the map server 170 and/or the mobile computing system 135. The client device 115 can include a computing device that includes a memory and a processor, for example a laptop computer, a desktop computer, a tablet computer, a mobile telephone, a personal digital assistant (PDA), a mobile email device or any other electronic device capable of accessing a network 105. In some embodiments, the user 125 can interact with the client device 115 via signal line 110. Although FIG. 1 illustrates one client device 115, the system 100 can include one or more client devices 115.

In some examples, the recognition application 109b can act in part as a thin-client application that may be stored on the client device 115 and in part as components that may be stored on one or more of the server 101, the social network server 120, the speech server 160 and/or the mobile computing system 135. For example, the server 101 can store custom vocabularies associated with a user and can generate graphical data for providing a user interface that depicts the custom vocabularies to the user. The recognition application 109b can send instructions to a browser (not shown) installed on the client device 115 to present the user interface on a display device (not shown) coupled to the client device 115. In some embodiments, the client device 115 may include a first navigation application 117. The first navigation application 117 can include code and routines for providing navigation instructions to a user. For example, the first navigation application 117 can include a global positioning system (GPS) application.

In some embodiments, the recognition application 109c is operable on a mobile computing system 135, which is coupled to the network 105 via signal line 134. In some embodiments, the mobile computing system 135 can send and receive data to and from one or more of the server 101, the search server 124, the social network server 120, the speech server 160, the map server 170 and/or the client device 115. The mobile computing system 135 can include any computing device that includes a memory and a processor. In some embodiments, the mobile computing system 135 can be one of a vehicle, an automobile, a bus, a bionic implant or any other mobile system with non-transitory computer electronics (e.g., a processor, a memory or any combination of non-transitory computer electronics). In some embodiments, the mobile computing system 135 includes a laptop computer, a tablet computer, a mobile phone or any other mobile device capable of accessing a network 105. In some embodiments, the user 125 can interact with the mobile computing system 135 via signal line 154. In some examples, a user 125 can be a driver driving a vehicle or a passenger sitting on a passenger seat. Although FIG. 1 illustrates one mobile computing system 135, the system 100 can include one or more mobile computing systems 135. In some embodiments, the mobile computing system 135 includes a second navigation application 107. The second navigation application 107 can include code and routines for providing navigation instructions to a user. For example, the second navigation application 107 can be a GPS application.

In some embodiments, the recognition application 109d is operable on the social network server 120, which is coupled to the network 105 via signal line 121. The social network server 120 can include a hardware and/or virtual server that includes a processor, a memory and network communication capabilities. In some embodiments, the social network server 120 can send and receive data to and from one or more of the client device 115, the server 101, the mobile computing system 135, the search server 124, the map server 170 and the speech server 160 via the network 105. The social network server 120 includes a social network application 122. A social network can be a type of social structure where the users may be connected by a common feature. The common feature includes relationships/connections, e.g., friendship, family, work, an interest, etc. In some examples, the common feature may include explicitly defined relationships and relationships implied by social connections with other online users. In some examples, relationships between users in a social network can be represented using a social graph that describes a mapping of the users in the social network and how the users are related to each other in the social network.

As a further example, the social network may store and maintain social groups of the users of the system 100 such as groups representing each user's colleagues, acquaintances, close family and friends, most active family and friends socially, stale/unused contacts, etc. These data groupings can be obtained from the social network using APIs exposed by the social network. For instance, the recognition application 109 can use the APIs to obtain the data groupings to determine the most relevant/important contacts of the user and filter out less significant contacts such as the stale/unused/restricted contacts and/or acquaintances that the user may rarely contact/interact with. The social network may also provide access, via the APIs, to the content streams of the users, which the recognition application 109 may use to independently determine which contacts, content, and/or locations are relevant to a particular user based on how frequently or recently they appear in the content streams that are relevant to that user. Other factors may also be used to determine the relevance of the contacts, content, and/or locations included in the content stream(s) relevant to a given user, such as whether that user liked/disliked/rated any of these items, the contextual information associated with any of the items, the items the user has expressly subscribed to receive information about and/or follow, any locations the user has visited relevant to the items, etc.

Although FIG. 1 includes one social network provided by the social network server 120 and the social network application 122, the system 100 may include multiple social networks provided by other social network servers and other social network applications.

In some embodiments, the recognition application 109e is operable on the speech server 160, which is coupled to the network 105 via signal line 163. The speech server 160 can include a hardware and/or virtual server that includes a processor, a memory and network communication capabilities. In some embodiments, the speech server 160 can send and receive data to and from one or more of the search server 124, the social network server 120, the server 101, the client device 115, the map server 170 and the mobile computing system 135. Although FIG. 1 illustrates one speech server 160, the system 100 can include one or more speech servers 160.

The recognition application 109 can include code and routines for providing personalized speech recognition to a user. In some embodiments, the recognition application 109 can be implemented using hardware including a field-programmable gate array (FPGA) or an application-specific integrated circuit (ASIC). In additional embodiments, the recognition application 109 can be implemented using a combination of hardware and software. In some embodiments, the recognition application 109 may be stored in a combination of the devices and servers, or in one of the devices or servers. The recognition application 109 is described below in more detail with reference to at least FIGS. 2-6B.

In some embodiments, the speech server 160 includes a speech engine 162 and a speech library 166. The speech engine 162 can be code and routines for conducting a search using personalized speech recognition. In some embodiments, the speech engine 162 can receive a speech command from a user and recognize one or more custom terms in the speech command. The speech engine 162 may conduct a search to retrieve a result that matches the speech command including the one or more custom terms, and may provide the result to the user. In additional embodiments, the speech engine 162 can receive a speech command including one or more custom terms from the recognition application 109. The speech engine 162 may conduct a search to retrieve a result that matches the speech command including the one or more custom terms. The speech engine 162 may send the result to the recognition application 109. The speech engine 162 is further described below with reference to at least FIG. 7.

A custom term can be a term configured for a user. For example, a custom term "home" can represent a home address associated with a user, a custom term "news app" can represent an application that provides news items to the user, and a custom term "Dad" can represent contact information (e.g., phone number, address, email, etc.) of the user's father, etc. Other example custom terms are possible.

A custom vocabulary can be a vocabulary including one or more custom terms associated with a user. For example, a custom vocabulary can be one of a place vocabulary, a contact vocabulary or a content vocabulary associated with a user. The place vocabulary can include one or more custom place terms (e.g., interest places, landmarks, road names, etc.) associated with the user. The contact vocabulary can include one or more custom contact terms (e.g., one or more contacts) associated with the user. The content vocabulary can include one or more custom content terms (e.g., content sources, content categories, etc.) associated with the user. The place vocabulary, the contact vocabulary and the content vocabulary are described below in more detail with reference to at least FIGS. 2 and 9A.

In some embodiments, the speech engine 162 includes a registration application 164. The registration application 164 can be code and routines for registering one or more custom vocabularies related to a user with the speech engine 162. In some embodiments, the registration application 164 can receive data describing one or more custom vocabularies associated with a user from the recognition application 109, register the one or more custom vocabularies with the speech engine 162 and store the one or more custom vocabularies in the speech library 166. For example, the registration application 164 can register interest places included in the place vocabulary with the speech engine 162, and can store the interest places (e.g., names and physical addresses associated with the interest places, etc.) in the speech library 166. In another example, the registration application 164 can register one or more contacts in the contact vocabulary with the speech engine 162 and store contact data (e.g., contact names, phone numbers, email addresses, mailing addresses, etc.) in the speech library 166.

In some embodiments, the registration application 164 can include an application programming interface (API) for registering one or more custom vocabularies with the speech engine 162. In some embodiments, the registration application 164 can update the custom vocabularies stored in the speech library 166 using new registered custom terms associated with a user.

The speech library 166 can store various registered custom vocabularies associated with various users. For example, the speech library 166 can store a place vocabulary, a contact vocabulary and a content vocabulary for each user. In some embodiments, the speech library 166 may store other example vocabularies for each user. In some embodiments, the speech library 166 may include a database management system (DBMS) for storing and providing access to data.

The search server 124 can be a hardware and/or virtual server that includes a processor, a memory and network communication capabilities. In some embodiments, the search server 124 can receive data describing a search query from one or more of the server 101, the social network server 120, the speech server 160, the client device 115 and the mobile computing system 135. The search server 124 may perform a search using the search query and generates a result matching the search query. The search server 124 may send the result to one or more of the server 101, the social network server 120, the speech server 160, the client device 115 and the mobile computing system 135. In some embodiments, the search server 124 is communicatively coupled to the network 105 via signal line 123. Although FIG. 1 includes one search server 124, the system 100 may include one or more search servers 124.

The map server 170 can include a hardware and/or virtual server that includes a processor, a memory and network communication capabilities. In some embodiments, the map server 170 can receive and send data to and from one or more of the server 101, the social network server 120, the speech server 160, the client device 115, the search server 124 and the mobile computing system 135. For example, the map server 170 can send data describing a map to one or more of the recognition application 109, the first navigation application 117 and the second navigation application 107. The map server 170 is communicatively coupled to the network 105 via signal line 171. In some embodiments, the map server 170 includes a point of interest (POI) database 172 and a map database 174.

The POI database 172 can store data describing points of interest (POIs) in different geographic regions. For example, the POI database 172 can store data describing tourist attractions, hotels, restaurants, gas stations, landmarks, etc., in one or more countries. In some embodiments, the POI database 172 may include a database management system (DBMS) for storing and providing access to data. The map database 174 can store data describing maps associated with one or more geographic regions. In some embodiments, the map database 174 may include a database management system (DBMS) for storing and providing access to data.

Example Recognition Application

Figure 2:
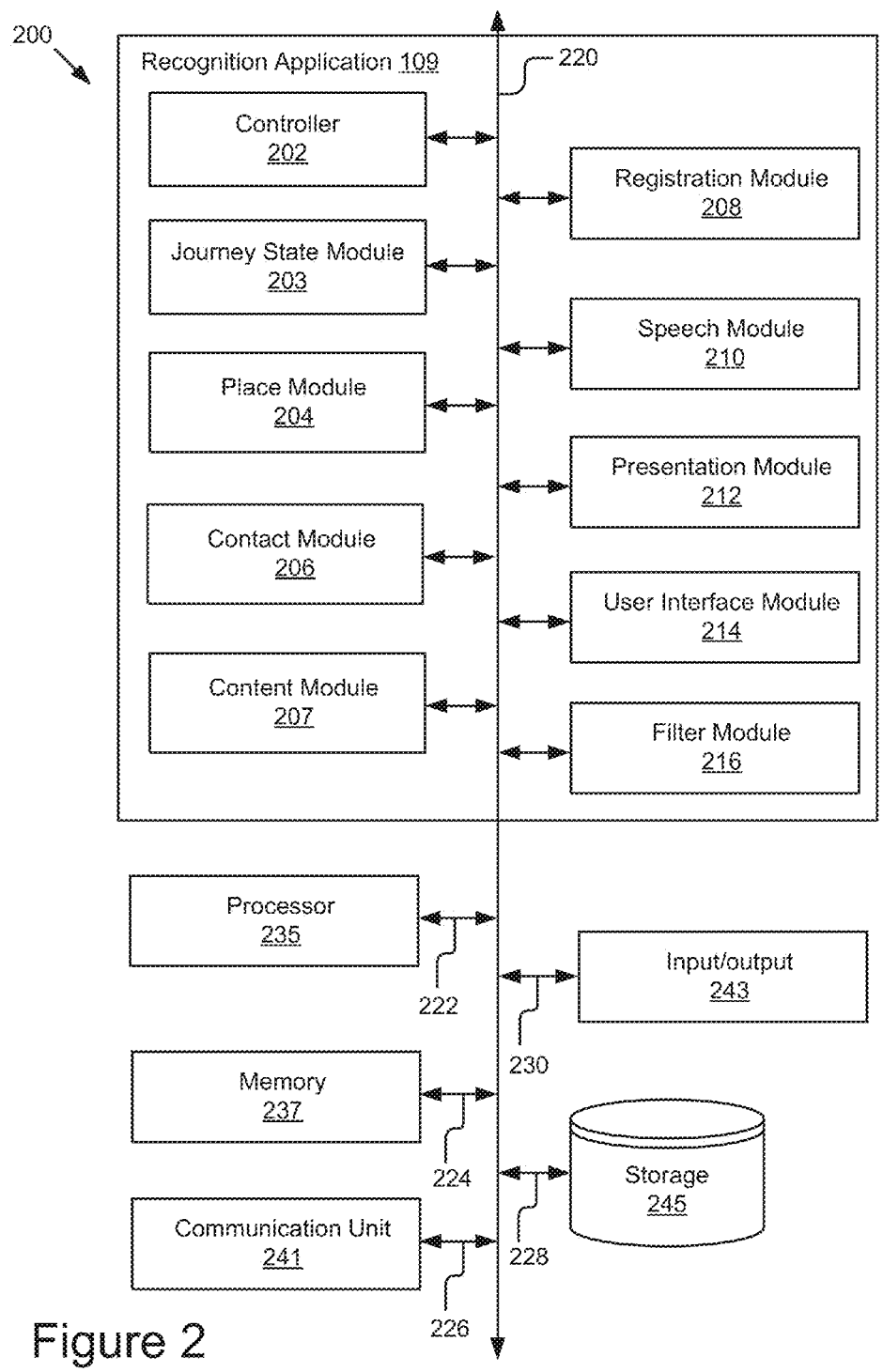
FIG. 2 is a block diagram illustrating an example of a recognition application.

Referring now to FIG. 2, an example of the recognition application 109 is shown in more detail. FIG. 2 is a block diagram of a computing device 200 that includes a recognition application 109, a processor 235, a memory 237, a communication unit 241, an input/output device 243 and a storage device 245 according to some embodiments. The components of the computing device 200 are communicatively coupled by a bus 220. The input/output device 243 is communicatively coupled to the bus 220 via signal line 230. In various embodiments, the computing device 200 can be a server 101, a client device 115, a mobile computing system 135, a social network server 120 or a speech server 160.

The processor 235 includes an arithmetic logic unit, a microprocessor, a general purpose controller or some other processor array to perform computations and provide electronic display signals to a display device. The processor 235 is coupled to the bus 220 for communication with the other components via signal line 222. Processor 235 processes data signals and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays and physical configurations are possible.

The memory 237 stores instructions and/or data that can be executed by the processor 235. The memory 237 is coupled to the bus 220 for communication with the other components via signal line 224. The instructions and/or data may include code for performing the techniques described herein. The memory 237 may be a dynamic random access memory (DRAM) device, a static random access memory (SRAM) device, flash memory or some other memory device. In some embodiments, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the communication unit 241 is communicatively coupled to the bus 220 via signal line 226. The communication unit 241 transmits and receives data to and from one or more of the server 101, the mobile computing system 135, the client device 115, the speech server 160, the search server 124, the map server 170 and the social network server 120 depending upon where the recognition application 109 is stored. In some embodiments, the communication unit 241 includes a port for direct physical connection to the network 105 or to another communication channel. For example, the communication unit 241 includes a USB, SD, CAT-5 or similar port for wired communication with the client device 115. In some embodiments, the communication unit 241 includes a wireless transceiver for exchanging data with the client device 115 or other communication channels using one or more wireless communication methods, including IEEE 802.11, IEEE 802.16, BLUETOOTH®, dedicated short-range communications (DSRC) or another suitable wireless communication method.

In some embodiments, the communication unit 241 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some embodiments, the communication unit 241 includes a wired port and a wireless transceiver. The communication unit 241 also provides other conventional connections to the network 105 for distribution of files and/or media objects using standard network protocols including TCP/IP, HTTP, HTTPS and SMTP, etc.

The storage device 245 can be a non-transitory memory that stores data for providing the structure, acts and/or functionality described herein. In some embodiments, the storage device 245 may include a database management system (DBMS) for storing and providing access to data. The storage device 245 may be a dynamic random access memory (DRAM) device, a static random access memory (SRAM) device, flash memory or some other memory devices. In some embodiments, the storage device 245 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the storage device 245 is communicatively coupled to the bus 220 via signal line 228. In some embodiments, the storage device 245 can store one or more of social network data, search data, navigation data, interest places, landmarks, road names, one or more filtering parameters (e.g., place filtering parameters, content filtering parameters, contact filtering parameters), a place vocabulary, a contact vocabulary and a content vocabulary associated with a user. The data stored in the storage device 245 is described below in more detail. In some embodiments, the storage device 245 may store other data for providing the structure, acts and/or functionality described herein.

In some embodiments, the recognition application 109 includes a controller 202, a journey state module 203, a place module 204, a contact module 206, a content module 207, a registration module 208, a speech module 210, a presentation module 212, a user interface module 214 and a filter module 216. These components of the recognition application 109 are communicatively coupled via the bus 220.

The controller 202 can be software including routines for handling communications between the recognition application 109 and other components of the computing device 200. In some embodiments, the controller 202 can be a set of instructions executable by the processor 235 to provide the structure, acts and/or functionality described below for handling communications between the recognition application 109 and other components of the computing device 200. In some embodiments, the controller 202 can be stored in the memory 237 of the computing device 200 and can be accessible and executable by the processor 235. The controller 202 may be adapted for cooperation and communication with the processor 235 and other components of the computing device 200.

The controller 202 can send and receive data, via the communication unit 241, to and from one or more of the client device 115, the social network server 120, the server 101, the speech server 160, the map server 170 and the mobile computing system 135 depending upon where the recognition application 109 may be stored. For example, the controller 202 can receive, via the communication unit 241, social network data from the social network server 120 and send the social network data to one or more of the place module 204 and the content module 207. In another example, the controller 202 can receive graphical data for providing a user interface to a user from the user interface module 214 and send the graphical data to the client device 115 or the mobile computing system 135, causing the client device 115 or the mobile computing system 135 to present the user interface to the user.

In some embodiments, the controller 202 may receive data from other components of the recognition application 109 and store the data in the storage device 245. For example, the controller 202 can receive graphical data from the user interface module 214 and store the graphical data in the storage device 245. In some embodiments, the controller 202 may retrieve data from the storage device 245 and send the retrieved data to other components of the recognition application 109. For example, the controller 202 can retrieve data describing a place vocabulary associated with the user from the storage 245 and send the data to the registration module 208.

The journey state module 203 can be software including routines for determining a state of a journey associated with a user. In some embodiments, the journey state module 203 can be a set of instructions executable by the processor 235 to provide the structure, acts and/or functionality described below for determining a state of a journey associated with a user. In some embodiments, the journey state module 203 can be stored in the memory 237 of the computing device 200 and can be accessible and executable by the processor 235. The journey state module 203 may be adapted for cooperation and communication with the processor 235 and other components of the computing device 200.

A state of a journey can describe a status and/or a context of a journey. For example, if the journey is a future journey, the state of the journey may include a start time, a start point, an end point, a journey duration, a journey route and/or one or more passengers (e.g., a kid boarding on a vehicle), etc., associated with the future journey. In another example, if the journey is a current journey that the user is taking, the state of the journey may include a start time, a start point, an end point, a journey duration, a journey route, the user's current location in the journey route, the current journey duration since the start time, the time to destination and/or one or more passengers boarding on a vehicle, etc., associated with the current journey.

In some embodiments, the journey state module 203 can receive a provisioning trigger event from the registration module 208, and can determine a state of a journey based on the provisioning trigger event. For example, the provisioning trigger event may indicate one of a user inserts a key to a keyhole in a vehicle, a wireless key is on, a key fob handshake process is performed, the user remotely controls the vehicle through an application stored on the client device 115, and/or the user is walking towards a vehicle. The journey state module 203 can determine a state of the journey as a start of the journey based on the provisioning trigger event. The provisioning trigger event is further described below in more detail.

In some embodiments, the journey state module 203 can retrieve user profile data associated with a user from the social network server 120 or a user profile server (not pictured) responsive to the provisioning trigger event. The user profile data may describe a user profile associated with the user. For example, the user profile data includes calendar data describing a personal calendar of the user, list data describing a to-do list, event data describing a preferred event list of the user (e.g., a list of events such as a concert, a sports game, etc.), social network profile data describing the user's interests, biographical attributes, posts, likes, dislikes, reputation, friends, etc., and/or demographic data associated with the user, etc. The journey state module 203 may retrieve social network data associated with the user from the social network server 120.

The journey state module 203 may retrieve mobile computing system data from the user's mobile computing system 135 responsive to the provisioning trigger event. The mobile computing system data can include provisioning data, location data describing a location of the mobile computing system 135, a synchronized local time, season data describing a current season, weather data describing the weather and/or usage data associated with the mobile computing system 135. In some embodiments, the mobile computing system 135 includes a vehicle, and the mobile computing system data includes vehicle data. Example vehicle data includes, but is not limited to, charging configuration data for a vehicle, temperature configuration data for the vehicle, location data describing a current location of the vehicle, a synchronized local time, sensor data associated with a vehicle including data describing the motive state (e.g., change in moving or mechanical state) of the vehicle, and/or vehicle usage data describing usage of the vehicle (e.g., historic and/or current journey data including journey start times, journey end times, journey durations, journey routes, journey start points and/or journey destinations, etc.).

In some embodiments, the journey state module 203 can determine a state of a journey associated with the user based on the user profile data, the mobile computing system data and/or the social network data. In some examples, the journey state module 203 can determine a state of a future journey that includes a start time, a journey start point and a journey destination, etc., for the future journey based at least in part on the social network data, the user profile data and the vehicle data. For example, if the vehicle data includes historic route data describing that the user usually takes a route from home to work around 8:00 AM during weekdays, the journey state module 203 can predictively determine a start time for a future journey to work as 8:00 AM in a weekday morning based on the historic route data. In another example, if the user profile data includes calendar data describing that the user has an early meeting at 8:30 AM in the next morning and the vehicle data includes route data describing that a driving time from home to work is less than 30 minutes, the journey state module 203 can predictively determine a start time for a future journey to work as a time before 8:00 AM such as 7:30 AM.

In some examples, the journey state module 203 can determine a state of a current journey that the user is currently taking based at least in part on the navigation data received from a GPS application in the user's vehicle. In some examples, the navigation data can be received from a client device 115 such as a mobile phone, a GPS unit, etc. For example, the journey state module 203 can determine the user's current location in the journey route, the time to destination and/or the current duration of the journey since departure, etc., based on the navigation data.

In some embodiments, the journey state module 203 can send the state of the journey (e.g., the state of a future journey or a current journey) to one or more of the place module 204, the contact module 206, the content module 207, the registration module 208 and the filter module 216. In additional embodiments, the journey state module 203 may store the state of the journey in the storage 245.

The place module 204 can be software including routines for generating a place vocabulary associated with a user. In some embodiments, the place module 204 can be a set of instructions executable by the processor 235 to provide the structure, acts and/or functionality described below for generating a place vocabulary associated with a user. In some embodiments, the place module 204 can be stored in the memory 237 of the computing device 200 and can be accessible and executable by the processor 235. The place module 204 may be adapted for cooperation and communication with the processor 235 and other components of the computing device 200.

Figure 9A:
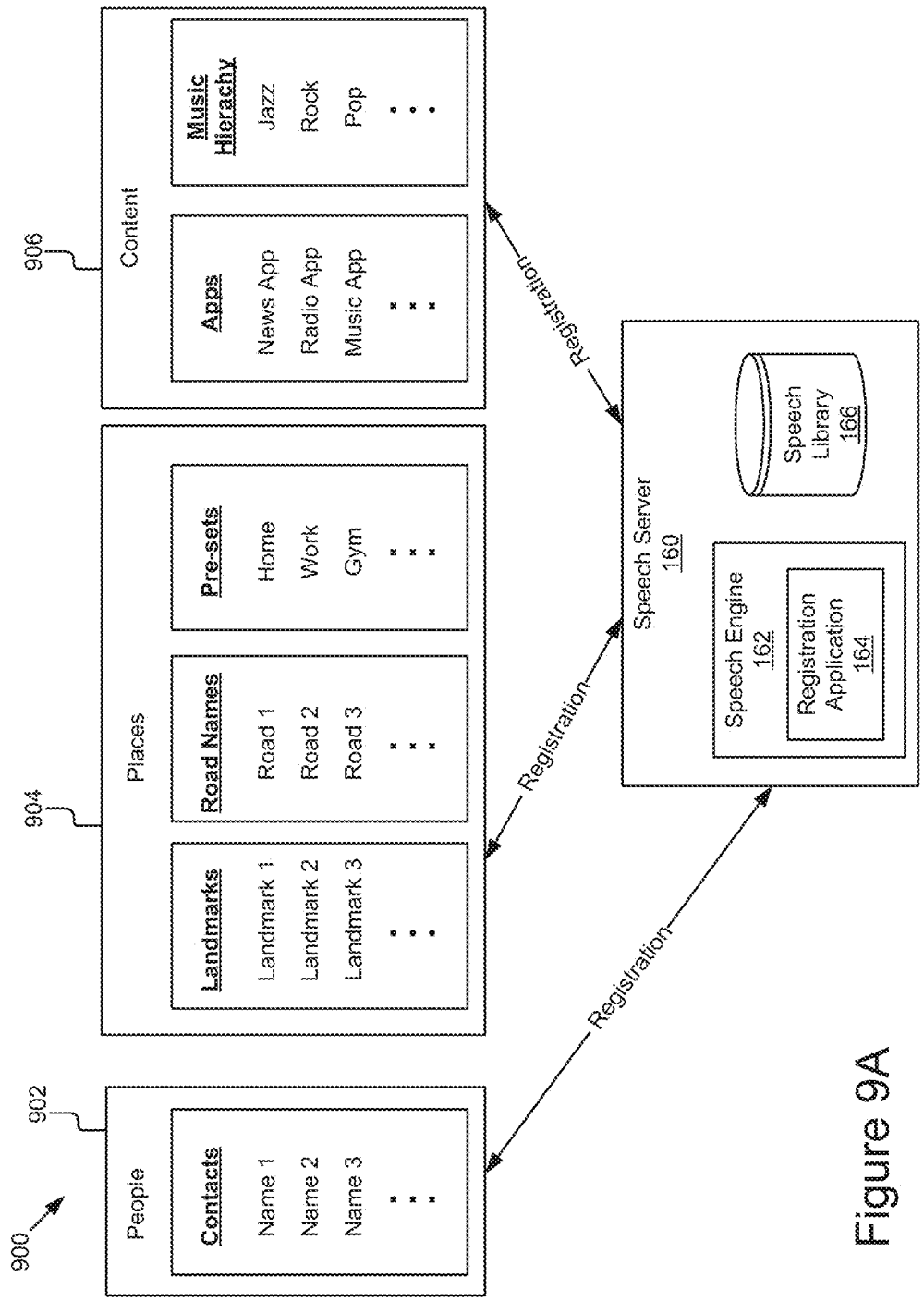
FIG. 9A is a graphic representation illustrating example custom vocabularies associated with a user.

A place vocabulary can be a custom vocabulary that includes location data associated with a user. For example, a place vocabulary includes one or more interest places, one or more landmarks and/or one or more road names associated with travel routes taken by the user. An example place vocabulary is illustrated in FIG. 9A. In some examples, the interest places and the landmarks are referred to as examples of points of interest. The place vocabulary may include other examples of points of interest.

An interest place may be a place that a user may be interested in. Example interest places include, but are not limited to, a travel destination, a stop point on a travel route, a home address, a working location, an address of a gym, an address of the user's doctor, a check-in place (e.g., a restaurant, a store checked in by the user in a social network, etc.), a location tagged to a post or an image, a place endorsed or shared by the user and a place searched by the user, etc. Other example interest places are possible. A stop point can be a location where the user stops during a journey. For example, a stop point can be a drive-through coffee shop, a drive-through bank, a gas station, a dry clean shop or a location where the user picks up or drops off a passenger. Other example stop points are possible.

In some embodiments, the place module 204 can receive social network data associated with a user from the social network server 120, for example, with the consent from the user. The social network data describes one or more social activities performed by the user on a social network. For example, the social network data describes one or more places checked in by the user using the client device 115 or the mobile computing system 135. In another example, the social network data includes posts, shares, comments, endorsements, etc., published by the user. In yet another example, the social network data includes social graph data describing a social graph associated with the user (e.g., a list of friends, family members, acquaintance, etc.). The social network data may include other data associated with the user. The place module 204 can determine one or more interest places associated with the user based on the user's social network data. For example, the place module 204 can parse the user's social network data and determine one or more interest places including: (1) places checked in by the user; (2) locations tagged to one or more posts or images published by the user and/or the user's friends; (3) places endorsed or shared by the user and/or the user's friends; and/or (4) locations and/or places mentioned in the user's posts or comments. In some embodiments, the place module 204 can determine one or more interest places implied by the user's social network data even though the one or more interest places are not explicitly checked in, tagged, endorsed or shared by the user. For example, if the user's social network data indicates the user is interested in oil painting, the place module 204 can determine one or more interest places for the user as one or more art museums or galleries in town.

In some embodiments, the place module 204 can determine one or more interest places further based on location data included in the social network data. For example, the location data includes data describing places and/or addresses associated with the user (e.g., places and/or addresses endorsed by the user, etc.). The place module 204 can determine one or more interest places as the places and/or addresses associated with the user. In some embodiments, the place module 204 can receive search data describing the user's social search history (e.g., search queries performed on a social network), and determine one or more interest places based on the user's search data. For example, the search data indicates the user has searched for restaurants that are most popular on the social network, and the place module 204 can determine one or more interest places as the restaurants that the user has searched for on the social network.

In some embodiments, the place module 204 can receive contacts data associated with the user, and determine the one or more interest places based on location data in the contacts data. For example, the contacts data can describe one or more addresses of the user's contacts, and the place module 204 can determine one or more interest places as the one or more addresses of the user's contacts. In some embodiments, the place module 204 can receive search data describing the user's contact search history, and determine one or more interest places based on the search data. For example, the place module 204 can determine one or more interest places as one or more addresses of contacts that the user searched for 1 hour ago.

In some embodiments, the place module 204 can receive search data associated with a user from a search server 124, for example, with the consent from the user. The search data may describe a search history that includes one or more search queries associated with the user. For example, the search data describes one or more restaurants, one or more travel destinations and one or more tourist attractions that the user searches online. In additional embodiments, the place module 204 can receive search data from a browser (not shown) installed on the client device 115 or the mobile computing system 135. In either embodiment, the place module 204 can determine one or more interest places associated with the user from the search data. For example, the place module 204 can determine one or more interest places as one or more places searched by the user.

In some embodiments, the place module 204 can receive navigation data associated with a user from the mobile computing system 135 and/or the client device 115. For example, the place module 204 can receive navigation data from the second navigation application 107 (e.g., an in-vehicle navigation system). In another example, the place module 204 can receive navigation data (e.g., GPS data updates in driving mode) from the first navigation application 117 (e.g., a GPS application installed on the client device 115). The navigation data describes one or more journeys taken by the user (e.g., historical journeys taken by the user in the past, a journey currently taken by the user, a planned future journey, etc.). For example, the navigation data includes one or more of travel start points, travel destinations, travel durations, travel routes, departure times and arrival times, etc., associated with one or more journeys. In another example, the navigation data includes GPS logs or GPS traces associated with the user. In some embodiments, the place module 204 can determine one or more interest places based on the navigation data. For example, the place module 204 can determine interest places as a list of travel destinations from the navigation data. In another example, the navigation data may include geo-location data associated with the user's mobile device which indicates that the user frequents various establishments (e.g., restaurants), even though the user does not explicitly check into those locations on the social network, the place module 204 can determine those locations as interest places provided, for instance, the user consents to such use of his/her location data.

In some embodiments, the place module 204 can process the navigation data to identify a travel route and/or one or more stop points associated with the travel route. For example, the place module 204 can process GPS logs included in the navigation data to identify a travel route taken by the user. In a further example, the place module 204 can receive sensor data from one or more sensors (not shown) that are coupled to the mobile computing system 135 or the client device 115. The place module 204 can determine a stop point for a travel route based on the sensor data and/or navigation data. For example, the place module 204 can receive one or more of speed data indicating a zero speed, GPS data indicating a current location and the time of the day, engine data indicating engine on or off in a vehicle and/or data indicating a parking break from one or more sensors, and can determine a stop point as the current location. In some embodiments, the place module 204 can determine one or more interest places based on the travel route and/or the one or more stop points. For example, the place module 204 can apply a clustering process to identify one or more interest places, which is described below with reference to at least FIGS. 8A and 8B.

In some embodiments, the place module 204 can determine one or more landmarks associated with the travel route and/or the one or more stop points. For example, the place module 204 can query the POI database 172 to retrieve a list of landmarks within a predetermined distance from the travel route and/or the one or more stop points. In some embodiments, the place module 204 can retrieve map data describing a map associated with the travel route and/or the one or more stop points from the map database 174. The place module 204 can determine one or more road names associated with the travel route and/or the one or more stop points based on the map data. For example, the place module 204 can determine names for one or more first roads that form at least part of the travel route and names for one or more second roads that intersect the travel route. In another example, the place module 203 can determine names for one or more roads leading to the one or more stop points.

In some embodiments, the place module 204 can aggregate the interest places generated from one or more of the social network data, the search data and/or the navigation data. The place module 204 can store the aggregated interest places, the one or more landmarks and/or the one or more road names in the storage device 245. In some embodiments, the place module 204 can generate a place vocabulary associated with the user using the aggregated interest places, the landmarks and/or the road names. For example, the place module 204 can populate a place vocabulary associated with the user using the interest places, the landmarks and/or the road names. For instance, the place vocabulary can include, for a given place known to the user, items that are located nearby, such as roads, intersections, other places, etc. In some embodiments, the place module 204 can also determine a frequency of visits and/or recency of visits to each custom place term in the place vocabulary based on the associated navigation data. For example, the place module 204 can determine a total number of visits and/or a timestamp of the user's last visit to each of the interest places, the landmarks and/or the roads.

In some embodiments, the place module 204 can determine one or more interest places based on the state of the journey associated with the user. For example, if the journey is a future journey and the state of the future journey includes an estimated route and/or destination for the future journey, the place module 204 may determine one or more interest places as one or more points of interest on the route, one or more road names on the route and/or one or more landmarks near the destination, etc. In another example, if the journey is a current journey that the user is taking and the state of the current journey includes a current location of the user on the journey route, the place module 204 may determine one or more interest places as one or more landmarks, roads, etc., near the user's current location, etc. This is beneficial as the place module 204 can predictively provide the interest places that the user is likely most interested in seeing, selecting from.

The place module 204 may populate the place vocabulary using the one or more interest places, and may update the one or more interest places and/or the place vocabulary based on updates on the state of the journey. For example, as the user travels on the journey route, the place module 204 may refresh the one or more interest places and/or place vocabulary in near real time based on the updated state of the journey, thus continuously suggest and/or make available the freshest, most relevant interest places to the user.

In some embodiments, the place module 204 can receive a provisioning trigger event from the registration module 208, and can generate and/or update the one or more interest places and/or the place vocabulary in response to the provisioning trigger event. For example, the place module 204 can generate and/or update the one or more interest places and/or the place vocabulary before the start time or at the start time of the journey in response to the provisioning trigger event, and thus allow the system 100 to provide the user with the freshest set of interest place information at journey time.

In some embodiments, the place module 204 sends the place vocabulary associated with the user to the filter module 216. In additional embodiments, the place module 204 stores the place vocabulary in the storage 245.

The contact module 206 can be software including routines for generating a contact vocabulary associated with a user. In some embodiments, the contact module 206 can be a set of instructions executable by the processor 235 to provide the structure, acts and/or functionality described below for generating a contact vocabulary associated with a user. In some embodiments, the contact module 206 can be stored in the memory 237 of the computing device 200 and can be accessible and executable by the processor 235. The contact module 206 may be adapted for cooperation and communication with the processor 235 and other components of the computing device 200.

In some embodiments, the contact module 206 can receive contact data from a user's address book stored on the mobile computing system 135 or the client device 115. The contact data describes one or more contacts associated with the user. For example, the contact data includes contact names, phone numbers, email addresses, etc., associated with the user's contacts. In additional embodiments, the contact module 206 can receive social graph data associated with the user from the social network server 120. The social graph data describes, for example, one or more family members, friends, coworkers and other acquaintance that are connected to the user in a social graph.

The contact module 206 can generate a contact vocabulary associated with the user using the contact data and the social graph data. For example, the contact module 206 can populate a contact vocabulary associated with the user using a list of contacts described by the contact data, a list of friends and/or other users that are connected to the user in a social graph. The contact vocabulary can be a custom vocabulary that includes one or more contacts associated with a user and information about these contacts, such as their physical addresses, phone numbers, current locations, electronic-mail addresses, etc. For example, a contact vocabulary includes one or more contacts from an address book, one or more friends and other connected users from a social network. An example contact vocabulary is illustrated in FIG. 9A. In some embodiments, the contact module 206 can also determine a frequency of interaction and/or recency of interaction with each contact represented by a custom contact term in the contact vocabulary. For example, the contact module 206 can determine a total number of interactions and/or a timestamp of the user's last interaction with each of the contacts in the contact vocabulary.

In some embodiments, the contact module 206 can determine one or more contacts based on the state of the journey associated with the user. For example, if the state of the journey indicates the journey is a trip to a restaurant for meeting some friends at dinner, the contact module 206 may populate the contact vocabulary with contact information associated with the friends before the start time or at the start time of the journey.

In some embodiments, the contact module 206 can receive a provisioning trigger event from the registration module 208, and can generate and/or update the place vocabulary in response to the provisioning trigger event. For example, the contact module 206 may refresh the contact vocabulary before the start time or at the start time of the journey in response to the provisioning trigger event.

In some embodiments, the contact module 206 can receive location data associated with the user, and populate the contact vocabulary based on contact information associated with the location data. For example, the location data may describe places associated with the user such as restaurants, coffee shops, stores, etc., that the user visited before. The contact module 206 can populate the contact vocabulary with contact information associated with the restaurants, coffee shops, stores, etc., that the user visited before.

In some embodiments, the contact module 206 sends the contact vocabulary associated with the user to the filter module 216. In additional embodiments, the contact module 206 stores the contact vocabulary in the storage 245.

The content module 207 can be software including routines for generating a content vocabulary associated with a user. In some embodiments, the content module 207 can be a set of instructions executable by the processor 235 to provide the structure, acts and/or functionality described below for generating a content vocabulary associated with a user. In some embodiments, the content module 207 can be stored in the memory 237 of the computing device 200 and can be accessible and executable by the processor 235. The content module 207 may be adapted for cooperation and communication with the processor 235 and other components of the computing device 200.

In some embodiments, the content module 207 can receive content data describing one or more content items from the mobile computing system 135 and/or the client device 115. For example, the content module 207 can receive content data that describes one or more audio items and/or video items played on the mobile computing system 135 or the client device 115. Example content items include, but are not limited to, a song, a news item, a video clip, an audio clip, a movie, a radio talk show, a photo, a graphic, traffic updates, weather forecast, etc.

In some embodiments, the content module 207 can receive data describing one or more content sources that provides one or more content items to the user. Example content sources include, but are not limited to, a radio station, a music application that provides music stream to a user, a news application that provides news stream to a user, a social application that provides a social stream to a user, and other applications that provide other content items to a user.

In some embodiments, the content module 207 can receive data describing one or more content categories associated with one or more content items or content sources. Example content categories include, but are not limited to, a music genre (e.g., rock, jazz, pop, etc.), a news category (e.g., global news, local news, regional news, etc.), a content category related to travel information (e.g., traffic information, road construction updates, weather forecast, etc.), a social category related to social updates (e.g., social updates from friends, family members, etc.), and an entertainment content category (e.g., music, TV shows, movies, animations, comedies, etc.).

The content module 207 can generate a content vocabulary associated with the user using the content data, the one or more content sources and/or the one or more content categories. For example, the content module 207 can populate a content vocabulary associated with the user using a list of content items, content sources and/or content categories. The content vocabulary can be a custom vocabulary that includes one or more custom terms related to content items.

For example, a content vocabulary can include one or more content sources (e.g., applications that provide content items to a user, a radio station, etc.), one or more content items played by the user and one or more content categories. An example content vocabulary is illustrated in FIG. 9A.

In some embodiments, the content module 207 can also determine: (1) a frequency of interaction with an item corresponding to a custom content term in the content vocabulary; and/or (2) a timestamp of a last interaction with the item. For example, the content module 207 can determine a total number of times that a content item (e.g., a song, a video) is played, a latest timestamp describing when the content item was played, how many times a content item was played over a particular period of time, whether the content item was liked or disliked by the user when played (e.g., using an Internet media service such as Pandora™ or Spotify™) a total number of times that an application (e.g., a radio station) is opened and a latest timestamp describing when the application was opened, etc.

In some embodiments, the content module 207 can populate the content vocabulary based on the state of the journey associated with the user. For example, if the state of the journey indicates the journey is a trip to attend a conference in a convention center, the content module 207 may populate the content vocabulary with news items, publications, etc., associated with the conference.

In some embodiments, the content module 207 can receive a provisioning trigger event from the registration module 208, and can generate and/or update the content vocabulary in response to the provisioning trigger event. For example, the content module 207 may refresh the content vocabulary before the start time or at the start time of the journey in response to the provisioning trigger event.

In some embodiments, the content module 207 sends the content vocabulary associated with the user to the filter module 216. In additional embodiments, the content module 207 stores the content vocabulary in the storage 245.

The registration module 208 can be software including routines for cooperating with the registration application 164 to register one or more custom vocabularies related to a user with the speech engine 162. In some embodiments, the registration module 208 can be a set of instructions executable by the processor 235 to provide the structure, acts and/or functionality described below for cooperating with the registration application 164 to register one or more custom vocabularies related to a user with the speech engine 162. In some embodiments, the registration module 208 can be stored in the memory 237 of the computing device 200 and can be accessible and executable by the processor 235. The registration module 208 may be adapted for cooperation and communication with the processor 235 and other components of the computing device 200.

A provisioning trigger event can be data triggering a provisioning service. For example, a provisioning trigger event may trigger an application to charge a vehicle automatically before a start time of a future journey. In some embodiments, the and/or update of the place vocabulary, the contact vocabulary and/or the content vocabulary can be examples of the provisioning service, and the provisioning trigger event may cause the place module 204 to refresh the place vocabulary, the contact module 206 to refresh the contact vocabulary and/or the content 207 to refresh the content vocabulary before the start time or at the start time of a journey, respectively. In this case, the updated place vocabulary, the updated contact vocabulary and the updated content vocabulary can be ready to use when the user starts the journey. In further examples, provisioning can be continuous or triggered at various intervals (e.g., autonomously or in response certain events). For instance, provisioning trigger events may occur continuously and/or at various intervals throughout a journey and the vocabularies may be refreshed responsively.

Example provisioning trigger events include, but are not limited to, an engine of a vehicle is just started, a key-on event (e.g., a key being inserted into a keyhole of a vehicle), a wireless key-on event, a key fob handshake event, a remote control event through a client device (e.g., the user remotely starting the vehicle using an application stored in a mobile phone, etc.), an event indicating the user is moving relative to a vehicle (e.g., towards, away from, etc.), arrival at a new and/or certain location, a change in the route on a current journey, the start of a journey (e.g., a vehicle is leaving a parking lot), a predictive event (e.g., prediction that a journey will start within a predetermined amount of time (e.g., an estimated future journey will start within 15 minutes)), etc. Other provisioning trigger events are possible.

In some embodiments, the registration module 208 can receive sensor data from one or more sensors associated with the mobile computing system 135, and can detect a provisioning trigger event based on the sensor data. For example, the registration module 208 can receive sensor data indicating a handshake process between a vehicle and a wireless key, and can detect a provisioning trigger event as a key fob handshake event. In another example, the registration module 208 can receive navigation data indicating the user changes the travel route from a GPS application, and can determine the provisioning trigger event as a change in the current journey route.

In some embodiments, the registration module 208 can receive data describing a future journey associated with a user from the journey state module 203 and detect a provisioning trigger event based on the future journey. For example, if the future journey is predicted to start at 8:30 AM, the registration module 208 can detect a provisioning trigger event that causes the place module 204 to update the place vocabulary, the contact module 206 to update the contact vocabulary and/or the content module 207 to update the content vocabulary before the start time or at the start time of the future journey. The registration module 208 can send the provisioning trigger event to the place module 204, the contact module 206 and/or the content module 207.

In some embodiments, the filter module 216 can filter a place vocabulary, a contact vocabulary and/or a content vocabulary associated with a user and can send the filtered place vocabulary, the filtered contact vocabulary and/or the filtered content vocabulary to the registration module 208. The filter module 216 is described below in more detail. The registration module 208 can cooperate with the registration application 164 to register the filtered place vocabulary, the filtered contact vocabulary and/or the filtered content vocabulary in the speech engine 162. For example, the registration module 208 can send the place vocabulary, the contact vocabulary and/or the content vocabulary to the registration application 164, causing the registration application 164 to register the place vocabulary, the contact vocabulary and/or the content vocabulary with the speech engine 162. In some embodiments, the registration module 208 registers the place vocabulary, the contact vocabulary and/or the content vocabulary with the speech engine 162 in response to the provisioning trigger event.

The speech module 210 can be software including routines for retrieving a result that matches a speech command. In some embodiments, the speech module 210 can be a set of instructions executable by the processor 235 to provide the structure, acts and/or functionality described below for retrieving a result that matches a speech command. In some embodiments, the speech module 210 can be stored in the memory 237 of the computing device 200 and can be accessible and executable by the processor 235. The speech module 210 may be adapted for cooperation and communication with the processor 235 and other components of the computing device 200.

In some embodiments, the speech module 210 may receive a speech command from a user. For example, the speech module 210 can receive a speech command from a microphone (not shown) that is coupled to the mobile computing system 135 or the client device 115. The speech module 210 can determine one or more custom terms in the speech command based on one or more registered custom vocabularies associated with the user. For example, the speech module 210 can determine: (1) one or more interest places, landmarks and road names in the speech command based on the place vocabulary; (2) one or more contacts in the speech command based on the contact vocabulary; and/or (3) one or more content sources, content categories and/or content items in the speech command based on the content vocabulary.

In some examples, the speech module 210 can retrieve a result that matches the speech command including the one or more custom terms from the storage 245. For example, the speech module 210 can receive a speech command that describes "call Dad now" from the user. The speech module 210 can recognize a custom term "Dad" in the speech command based on the registered contact vocabulary, and can retrieve a phone number associated with the custom term "Dad" from the storage device 245. The speech module 210 can instruct the presentation module 212 to call the retrieved phone number automatically for the user.

In some other examples, the speech module 210 can send the speech command including the one or more custom terms to the speech engine 162, causing the speech engine 162 to perform a search using the one or more custom terms and the speech command. The speech engine 162 can retrieve a result that matches the speech command including the one or more custom terms from the search server 124. The speech engine 162 can send the result to the speech module 210. For example, assume the speech command describes "find me a coffee shop close by home." The speech module 210 can recognize a custom term "home" in the speech command based on the place vocabulary. The speech module 210 can retrieve a home address represented by the custom term "home" from the storage 245 and send the speech command including the home address represented by the custom term "home" to the speech engine 162. The speech engine 162 can retrieve a result that matches the speech command including the home address represented by the custom term "home" from the search server 124, and can send the result to the speech module 210. The result includes addresses and navigation instructions to coffee shops close by the home address.

In some examples, assume the speech command describes "find me a burger place near where Dad is." The speech module 210 can recognize a custom contact term "Dad" in the speech command based on a contact vocabulary. The speech module 210 can determine a location related to Dad with permission from Dad. For example, the location associated with Dad can be Dad's physical home or work address stored in the contact vocabulary. In another example, the location associated with Dad can be a current location where Dad's mobile phone is currently located. In yet another example, the location associated with Dad can be a current location where Dad's vehicle is currently located. The speech module 210 can send the speech command including the location related to the custom contact term "Dad" to the speech engine 162. The speech engine 162 can retrieve a result that matches the speech command including the location related to the custom contact term "Dad" from the search server 124, and may send the result back to the speech module 210. The result includes addresses and navigation instructions to burger places near where Dad is.

In some embodiments, the speech module 210 can receive a speech command from a user and send the speech command to the speech engine 162 without determining any custom terms in the speech command. The speech engine 162 can recognize one or more custom terms in the speech command by performing operations similar to those described above. The speech engine 162 can retrieve a result that matches the speech command including the one or more custom terms from the search server 124. The speech engine 162 can send the result to the speech module 210.

For example, the speech module 210 can receive a speech command that describes "find me a coffee shop close by home" from the user and can send the speech command to the speech engine 162. The speech engine 162 can recognize a custom term "home" in the speech command based on the registered place vocabulary associated with the user, and can retrieve data describing a home address represented by the custom term "home" from the speech library 166. The speech engine 162 can retrieve a result that matches the speech command including the custom term "home" from the search server 124 and can send the result to the speech module 210. The result includes addresses and navigation instructions to coffee shops close by the home address.

In another example, the speech module 210 can receive a speech command that describes "open music app" from the user and send the speech command to the speech engine 162, where "music app" is the user's way of referencing to a particular music application that goes by a different formal name. The speech engine 162 can recognize a custom term "music app" in the speech command based on the registered content vocabulary associated with the user. The speech engine 162 can retrieve a result describing an application corresponding to the custom term "music app" from the speech library 166 and send the result to the speech module 210. The speech module 210 can instruct the presentation module 212 to open the application for the user.

In some embodiments, the speech module 210 may receive a speech command indicating to search for one or more target places near, close by, or within a specified proximity of a known place such as a known location, a known point of interest, a known intersection, etc. The terms "near" and/or "close by" indicate the one or more target places may be located within a predetermined distance from the known location. The speech module 210 can determine the one or more target places as places matching the speech command and within the predetermined distance from the known place identified in the speech command. For example, assume the speech command describes to search for restaurants near an intersection that intersects a first road XYZ and a second road ABC. The speech module 210 can recognize custom terms "near" and the intersection intersecting the first road XYZ and the second road ABC from the speech command. The speech module 210 can instruct the speech engine 162 to search for restaurants within a predetermined distance from the intersection.

In some embodiments, the predetermined distance can be configured by a user. In some additional embodiments, the predetermined distance can be configured automatically using heuristic techniques. For example, if a user usually selects a target place within 0.5 mile from a known place, the speech module 210 determines that the predetermined distance configured for the user can be 0.5 mile. In some additional embodiments, the predetermined distance can be determined based on a geographic characteristic of the known place identified in the speech command. For example, a first predetermined distance for a first known place in a downtown area can be smaller than a second predetermined distance for a second known place in a rural area.

In some embodiments, the speech module 210 can receive a speech command from a user, and can recognize one or more custom place terms from the speech command. The speech module 210 can determine one or more physical addresses associated with the one or more custom place terms based on navigation signals (e.g., location signals, GPS signals) received from a device associated with the user such as a mobile computing system 135 (e.g., a vehicle) and/or a client device 115 (e.g., a mobile phone). The speech module 210 may instruct the speech engine 162 to search for results that match the one or more physical addresses associated with the one or more custom place terms. For example, assume the speech command describes "find me a coffee shop near my current location" or "find me a coffee shop within a mile of my current location." The speech module 210 can determine a custom place term "my current location" from the speech command, where a physical address associated with the custom place term "my current location" is not a fixed location and depends on where the user is currently at. The speech module 210 may determine a current physical address associated with the custom place term "my current location" based on location signals received from the user's mobile phone or the user's vehicle. The speech module 210 may send the speech command including the current physical address associated with the user's current location to the speech engine 162, so that the speech engine 162 can search for coffee shops near (e.g., within a predetermined distance) or within a mile from the user's current location.

In some embodiments, a speech command may simultaneously include one or more custom place terms, one or more custom contact terms and/or one or more custom content terms. For example, a speech command describing "find me restaurants near home and recommended by XYZ restaurant review app" includes a custom place term "home" and a custom content term "XYZ restaurant review app." The speech module 210 can recognize the custom place term "home" and the custom content term "XYZ restaurant review app" in the speech command based on the place vocabulary and the content vocabulary. The speech module 210 can determine a list of target places (e.g., restaurants) that are recommended by the XYZ restaurant review application, and can filter the list of target places based on a physical address associated with the custom place term "home." For example, the speech module 210 can determine one or more target places (e.g., restaurants) that are within a predetermined distance from the physical address associated with the custom place term "home" from the list of target places, and can generate a result that includes the one or more target places and navigation information related to the one or more target places. The one or more target places satisfies the speech command (e.g., the one or more target places are recommended by the XYZ restaurant review application and near the physical address associated with "home").

In another example, a speech command describing "find me restaurants near Dad and recommended by XYZ restaurant review app" includes a custom contact term "Dad" and a custom content term "XYZ restaurant review app." The speech module 210 can recognize the custom contact term "Dad" and the custom content term "XYZ restaurant review app" in the speech command based on the contact vocabulary and the content vocabulary. The speech module 210 can determine a list of target places (e.g., restaurants) that are recommended by the XYZ restaurant review application. The speech module 210 can also determine a location associated with Dad (e.g., a physical address associated with Dad and stored in the contact vocabulary, a current location associated with Dad's mobile phone or vehicle, etc.). The speech module 210 can filter the list of target places based on the location associated with the custom contact term "Dad." For example, the speech module 210 can determine one or more target places (e.g., restaurants) that are within a predetermined distance from the location associated with the custom contact term "Dad" from the list of target places, and can generate a result that includes the one or more target places and navigation information related to the one or more target places.

In some embodiments, the speech module 210 sends the result to the presentation module 212. In additional embodiments, the speech module 210 stores the result in the storage 245.

The presentation module 212 can be software including routines for providing a result to a user. In some embodiments, the presentation module 212 can be a set of instructions executable by the processor 235 to provide the structure, acts and/or functionality described below for providing a result to a user. In some embodiments, the presentation module 212 can be stored in the memory 237 of the computing device 200 and can be accessible and executable by the processor 235. The presentation module 212 may be adapted for cooperation and communication with the processor 235 and other components of the computing device 200.

In some embodiments, the presentation module 212 can receive a result that matches a speech command from the speech module 210. The presentation module 212 can provide the result to the user. In some examples, the result includes an audio item, and the presentation module 212 can deliver the result to the client device 115 and/or the mobile computing system 135, causing the client device 115 and/or the mobile computing system 135 to play the audio item to the user using a speaker system (not shown). In some examples, the presentation module 212 can instruct the user interface module 214 to generate graphical data for providing a user interface that depicts the result to the user. In some examples, the result includes a contact that matches the speech command, and the presentation module 212 can automatically dial a phone number associated with the contact for the user. In some examples, the result includes an application that matches the speech command, and the presentation module 212 can automatically open the application for the user.

The user interface module 214 can be software including routines for generating graphical data for providing user interfaces to users. In some embodiments, the user interface module 214 can be a set of instructions executable by the processor 235 to provide the structure, acts and/or functionality described below for generating graphical data for providing user interfaces to users. In some embodiments, the user interface module 214 can be stored in the memory 237 of the computing device 200 and can be accessible and executable by the processor 235. The user interface module 214 may be adapted for cooperation and communication with the processor 235 and other components of the computing device 200.

In some embodiments, the user interface module 214 can generate graphical data for providing a user interface that presents a result to a user. The user interface module 214 can send the graphical data to a client device 115 and/or a mobile computing system 135, causing the client device 115 and/or the mobile computing system 135 to present the user interface to the user. Example user interfaces are illustrated with reference to at least FIGS. 10B-10F. In some embodiments, the user interface module 214 can generate graphical data for providing a user interface to a user, allowing the user to configure one or more custom vocabularies associated with the user. For example, the user interface allows the user to add, remove or modify custom terms in the one or more custom vocabularies. The user interface module 214 may generate graphical data for providing other user interfaces to users.

The filter module 216 can be software including routines for filtering one or more custom vocabularies associated with a user based on one or more filtering parameters. In some embodiments, the filter module 216 can be a set of instructions executable by the processor 235 to provide the structure, acts and/or functionality described below for filtering one or more custom vocabularies associated with a user based on one or more filtering parameters. In some embodiments, the filter module 216 can be stored in the memory 237 of the computing device 200 and can be accessible and executable by the processor 235. The filter module 216 may be adapted for cooperation and communication with the processor 235 and other components of the computing device 200.

A filtering parameter can be data used to filter a custom vocabulary. For example, a filtering parameter can be a place filtering parameter, a contact filtering parameter, a content filtering parameter, or a combination of the foregoing. The place filtering parameter, the content filtering parameter and the contact filtering parameter are described below in more detail. In some embodiments, the place filtering parameter, the content filtering parameter and/or the contact filtering parameter can be hard-coded and pre-stored in the storage 245.

In some embodiments, the filter module 216 can receive a place vocabulary associated with a user from the place module 204. The filter module 216 can receive data describing one or more place filtering parameters and filter the place vocabulary based on the one or more place filtering parameters as described below in more detail. A place filtering parameter can be data used to filter a place vocabulary. Example place filtering parameters include, but are not limited to, a user's current geographical location, the time of the day, a frequency of visits to a location corresponding to a custom place term (e.g., a most frequently visited gas station, a supermarket visited once a week, etc.), recency of visits to a location corresponding to a custom place term (e.g., a recently visited restaurant), and a place category that a custom place term is classified to (e.g., a Japanese restaurant, an Italian restaurant or a Mexican restaurant, etc.).

In some embodiments, the filter module 216 can receive data describing a current geographical location associated with the user and/or the time of the day. This data can be received from one or more of the first navigation application 117 (e.g., a mapping app, a GPS app, etc.), the second navigation application 107 (e.g., a geolocation app, a recommendations app, a mapping app, etc.), or another entity of the system 100, such as the social network server 120, a location server of a mobile network (not shown), etc. The filter module 216 can filter the place vocabulary based on the user's current geographical location and/or the time of the day. For example, if the time of the day is 8:20 AM, the filter module 216 can remove all the custom place terms corresponding to restaurants that do not provide breakfast options from the place vocabulary. In another example, the filter module 216 may configure a coverage range for the place vocabulary based on the user's current geographical location, and may filter the place vocabulary to: (1) retain custom place terms that correspond to locations within the coverage range (e.g., interest places, landmarks, roads within the coverage range) in the place vocabulary; and/or (2) remove custom place terms that correspond to locations outside the coverage range from the place vocabulary.

A coverage range can be a geographical area that covers locations corresponding to custom place terms included in the place vocabulary. For example, the filter module 216 can configure the user's current location as a center point, and can configure the coverage range as a circular area determined by the center point and a coverage radius. An example coverage range is illustrated with reference to at least FIG. 9B. In some examples, a coverage range can be of a rectangular shape, a square shape, a triangular shape, a circular shape or any other geometric shape. In some cases, the shaped of the coverage range can be disjointed and/or discontinuous. For instance, the coverage range may include populated areas and exclude less or non-populated areas.

In some embodiments, the filter module 216 can configure a size of a coverage area based on the user's current geographical location. For example, the size in a downtown area (e.g., an areas with a 1 mile radius, covering 1 square mile, etc.) can be smaller than a coverage area in a suburban location (e.g., an area having a 10 mile radius, covering 10 square miles, etc.). In some embodiments, the filter module 216 can determine a coverage area using a coverage radius, which is come cases, can be computed using heuristic techniques. In some embodiments, the filter module 216 can determine a coverage area and/or radius based on a size of the place vocabulary. For example, the filter module 216 can configure a larger coverage radius/area so that a larger coverage range is generated if the size of the place vocabulary is increased. The size of the place vocabulary may indicate, for example, a maximal number of custom place terms to be included in the place vocabulary. In additional embodiments, a coverage radius/area can be configured by an administrator of the computing device 200.

In some embodiments, the filter module 216 can filter the place vocabulary based on the frequency of the user's visits and/or recency of those visits to the corresponding locations described by the custom place terms in the place vocabulary. For example, the filter module 216 can rank the custom place terms based on the frequency of the user's visits and/or recency of those visits to the corresponding locations described by the custom place terms, and can filter the place vocabulary to: (1) retain custom place terms with highest rankings in the place vocabulary; and/or (2) remove other custom place terms from the place vocabulary. In another example, the filter module 216 can filter the place vocabulary to generate a filtered place vocabulary that includes custom place terms corresponding to the most frequently visited locations and/or the most recently visited locations.

In some embodiments, the filter module 216 can retrieve data describing one or more user preferences from the storage 245 and can filter the place vocabulary based on the one or more user preferences. For example, assume the one or more user preferences describe one or more place categories preferred by the user. The filter module 216 can filter the place vocabulary to: (1) retain custom place terms associated with the one or more preferred place categories in the place vocabulary; and/or (2) remove custom place terms related to other non-preferred place categories from the place vocabulary. For example, if the user's preferred restaurant categories include Japanese and Italian restaurants, the filter module 216 can generate a filtered place vocabulary that includes Japanese and Italian restaurants.

In additional embodiments, the filter module 216 can filter the place vocabulary based on one or more of the user's current or recent geographical location, the time of the day the user was at that location, the frequency of the user's visits and/or recency of those visits to locations corresponding to custom place terms in the place vocabulary, the user preferences, the user's friends preferences that the user frequently interacts with (e.g., the user's close friends, family, colleagues, etc.), the size of the place vocabulary, and/or other contact, content, and or location-related factors, such as those discussed elsewhere herein.

In some embodiments, the filter module 216 can receive a contact vocabulary associated with a user from the contact module 206. The filter module 216 can receive data describing one or more contact filtering parameters and can filter the contact vocabulary based on the one or more contact filtering parameters as described below in more detail. A contact filtering parameter can be data used to filter a contact vocabulary. Example contact filtering parameters include, but are not limited to, a social network contact category (e.g., friends, colleagues, acquaintances, restricted contacts, etc.), an address book category (e.g., favorite contacts, family members, friends, etc.), a frequency of interaction with a contact (e.g., a most frequently called contact, a contact called once a week, etc.) and/or recency of interaction with a contact (e.g., a recently called contact, a contact called one month ago, etc.), contacts, content, and/or locations followed on a social network and/or included in applicable social network content streams, contacts having similar content, event, social, etc., preferences determined from social network data, preference data, etc., etc.

In some embodiments, the filter module 216 can receive data describing one or more social network contact categories associated with contacts that are retrieved from the user's social graph. For example, the filter module 216 can receive data describing a group of friends, a group of family members and/or a group of acquaintances from the social network server 120. The filter module 216 can receive data describing one or more address book categories associated with contacts that are retrieved from the user's address book. For example, the filter module 216 can receive data describing a group of the user's favorite contacts and/or a group of most frequently called contacts from the user's address book. The filter module 216 can filter the contact vocabulary based on the social network contact categories and/or the address book categories. The filter module 215 can receive data describing which contacts the user visits and/or interacts (e.g., socializes with) most based on location data. For example, the filter module 216 can filter the contact vocabulary to: (1) retain one or more of favorite contacts, friends, family members and/or colleagues in the contact vocabulary; and/or (2) remove acquaintances, stale contacts, and/or restricted contacts, etc. from the contact vocabulary. As with the place and content vocabularies, since the user's preferences for various contacts, places, and content may constantly change, the filtering performed by the filter module 216 can be performed dynamically (e.g., instantaneously, routinely (e.g., by the second, minute, hour, day, etc.), etc. to reflect those changing preferences/reflect the user's current behavior.

In some embodiments, the filter module 216 can filter the contact vocabulary based on the frequency of the user's interactions and/or recency of those interactions with contacts in the contact vocabulary. For example, the filter module 216 can rank the custom contact terms based on the user's interactions and/or recency of those interactions with the corresponding contacts, and can filter the contact vocabulary to: (1) retain custom contact terms with rankings meeting a one or more predetermined criteria in the contact vocabulary; and/or (2) remove other custom contact terms from the contact vocabulary. The criteria may include a threshold number of contacts (e.g., 25, 50, 100), a quality threshold, etc. For instance, each contact may be ranked using a quality score computed by or predetermined for/by the filtering module for the contacts based on their relationship to the target user (e.g., one or more of the filtering parameters discussed herein). This quality score may be compared to the predetermined criteria (e.g., a quality threshold), and the contacts may be included in the vocabulary if they meet this threshold. In another example, the filter module 216 can filter the contact vocabulary to generate the filtered contact vocabulary that includes custom contact terms corresponding to the most popular (e.g., frequently interacted with, most recently interacted with, etc.) contacts. For example, the filtered contact vocabulary can include the most frequently and/or recently called, messaged (e.g., via text, email, social), and/or visited contacts.

In additional embodiments, the filter module 216 can filter the contact vocabulary based on one or more of the one or more social network contact categories, the one or more address book categories, the size of the contact vocabulary, the frequency, quality, and/or recency of interaction with the contacts, the communication mechanism used for the interaction (e.g., call, text, email, social network, instant message, microblog, etc.). The size of the contact vocabulary indicates, for example, a maximal number of custom contact terms to be included in the contact vocabulary.

In some embodiments, the filter module 216 can receive a content vocabulary associated with a user from the content module 207. The filter module 216 can receive data describing one or more content filtering parameters and can filter the content vocabulary based on the one or more content filtering parameters as described below in more detail. A content filtering parameter can be data used to filter a content vocabulary. Example content filtering parameters include, but are not limited to, the user's social network data that includes the user's engagement actions (e.g., endorsements, comments, sharings, favorites, followings, topic subscriptions, etc.), the user's messaging data (e.g., email, texts, chats, etc.), the user preferences (e.g., the user's ratings), the type of content (e.g., type of music, news, artists, entities, etc.) interacted with by the user, the frequency of interaction with an item corresponding to a custom content term (e.g., how frequently a content item is played, a radio station is listened to, a topic or entity is searched for, a feed is accessed, etc.), a timestamp of a last interaction with an item corresponding to a custom content term (e.g., a recently played content item, a recently used application), how frequently a user interacted with a given content item over a given timeframe, etc.

In some embodiments, the filter module 216 can filter the content vocabulary based on the frequency and/or recency of the user's interactions with items corresponding to custom content terms in the content vocabulary. For example, the filter module 216 can rank the custom content terms based on the frequency and/or recency of the user's interactions with items corresponding to the custom content terms, and can filter the content vocabulary to: (1) retain custom content terms satisfying one or more criterion (e.g., a ranking level) in the content vocabulary; and/or (2) remove other custom content terms from the content vocabulary, as discussed in further detail above with reference to the contact vocabulary. In another example, the filter module 216 can filter the content vocabulary to generate the filtered content vocabulary that includes custom content terms corresponding to the items most frequently interacted or recently interacted with (by the user and/or the user's relevant contacts). For example, the filtered content vocabulary can include the most frequently played songs, the most frequently used applications, the most recently accessed social streams, and/or the most recently played videos.

In some embodiments, the filter module 216 can receive the user's social network data including the user's engagement actions from the social network server 120. The filter module 216 can filter the content vocabulary based on the user's social network data. For example, the filter module 216 can generate the filtered content vocabulary that includes custom content terms corresponding to items matching the user's endorsements, sharings, followings, subscriptions and/or comments published in a social network. In a further example, the filter module 216 can filter the content vocabulary to: (1) retain a first radio station (or song played thereby) in the content vocabulary since the user has endorsed the first radio station (or a song played thereby); and/or (2) remove a second radio station (or song played thereby) from the content vocabulary that was disliked by the user.

In some embodiments, the filter module 216 can retrieve data describing one or more user preferences (e.g., the user's ratings for one or more items) from the storage 245 and can filter the content vocabulary based on the one or more user preferences. For example, the filter module 216 can rank custom content terms in the content vocabulary based on the user's ratings related to the custom content terms and can filter the content vocabulary to: (1) retain the custom content terms satisfying a criteria (e.g., a ranking threshold) in the content vocabulary; and/or (2) remove other content custom items from the content vocabulary, as discussed elsewhere herein. In another example, the filter module 216 can generate the filtered content vocabulary based on the user's ratings for the content sources or content categories, so that the filtered content vocabulary includes content items from content sources or content categories with highest ratings (e.g., ratings that meet or exceed a threshold defined as reflecting preferred content). For example, the filter module 216 can generate the filtered content vocabulary that includes the user's preferred music genre, the user's preferred podcast sources, content items related to the user's preferred music genre and content items from the user's preferred podcast sources, etc.

In additional embodiments, the filter module 216 can filter the content vocabulary based on one or more of the user's social network data including the user's engagement actions, the user preferences, the frequencies of interaction with items corresponding to the custom content terms, timestamps of last interactions with items corresponding to the custom content terms and/or the size of the content vocabulary, etc. The size of the content vocabulary can indicate, for example, a maximal number of custom content terms to be included in the content vocabulary.

In some embodiments, the filter module 216 filters the place vocabulary, the contact vocabulary and/or the content vocabulary based on one or more filtering parameters to restrict and/or limit the sizes of the place vocabulary, the contact vocabulary and/or the content vocabulary. The filtering of the custom vocabularies is beneficial in numerous respects. For example, for a custom vocabulary having a finite fixed size, the filtering of the custom vocabulary can retain custom terms having most significance to the user in the custom vocabulary and can remove custom terms having least significance to the user from the custom vocabulary. In another example, for a custom vocabulary having a variable size, the filtering of the custom vocabulary can remove custom terms having least significance from the custom vocabulary and therefore reduce the size of the custom vocabulary. In either example, the filtering of the custom vocabulary can prevent the system 100 from slowing down in speech recognition and allow the system 100 to achieve: (1) faster speech recognition; (2) improvement on accuracy of speech recognition; (3) better learning of the user's preferences; and (4) more personalized experience provided to the user. It should be understood that these benefits are non-limiting, and that other benefits and/or advantages are also realized.

Methods

Figure 3A:
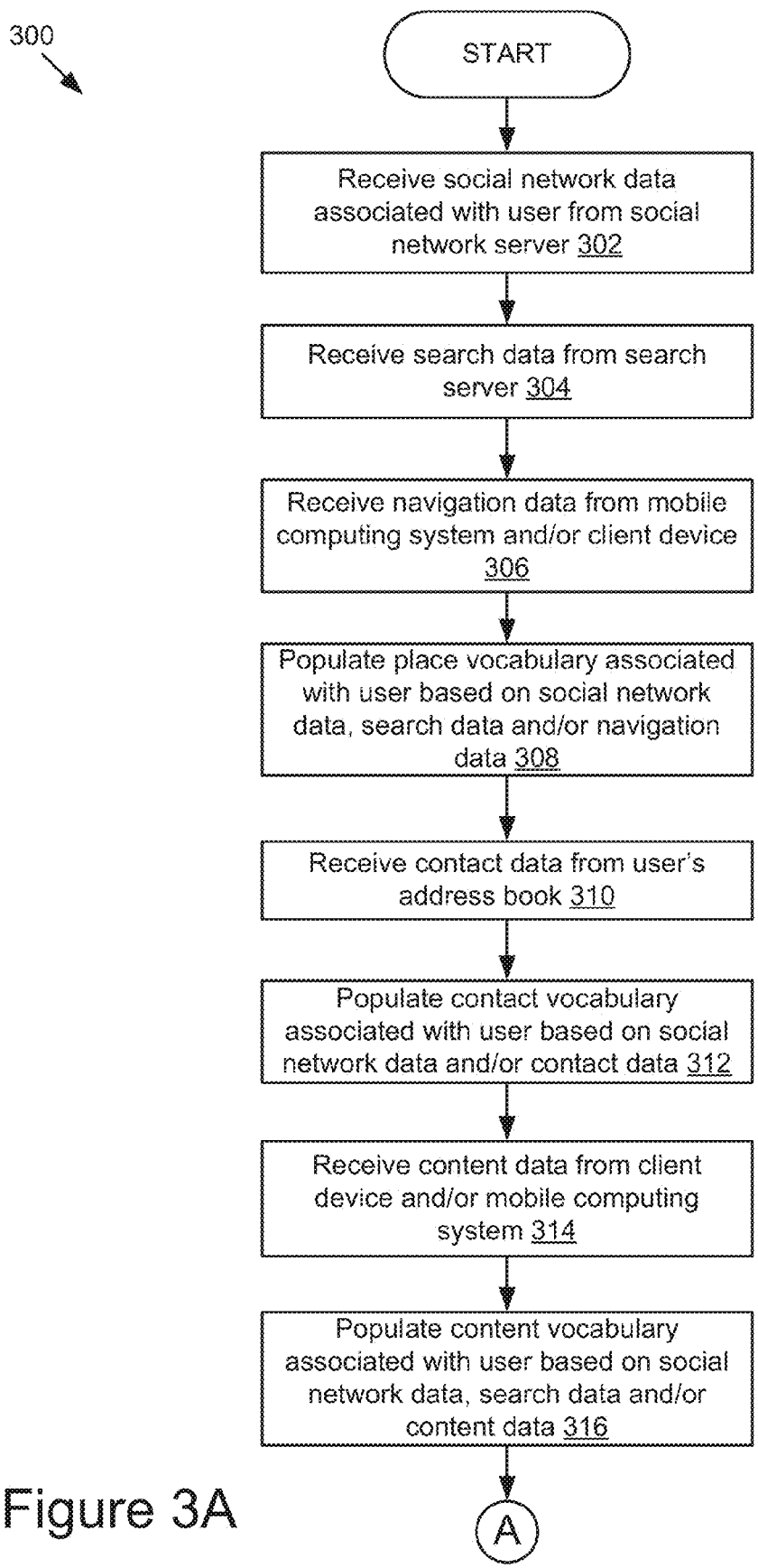
FIGS. 3A and 3B are flowcharts of an example method for configuring custom vocabularies for personalized speech recognition.
Figure 3B:
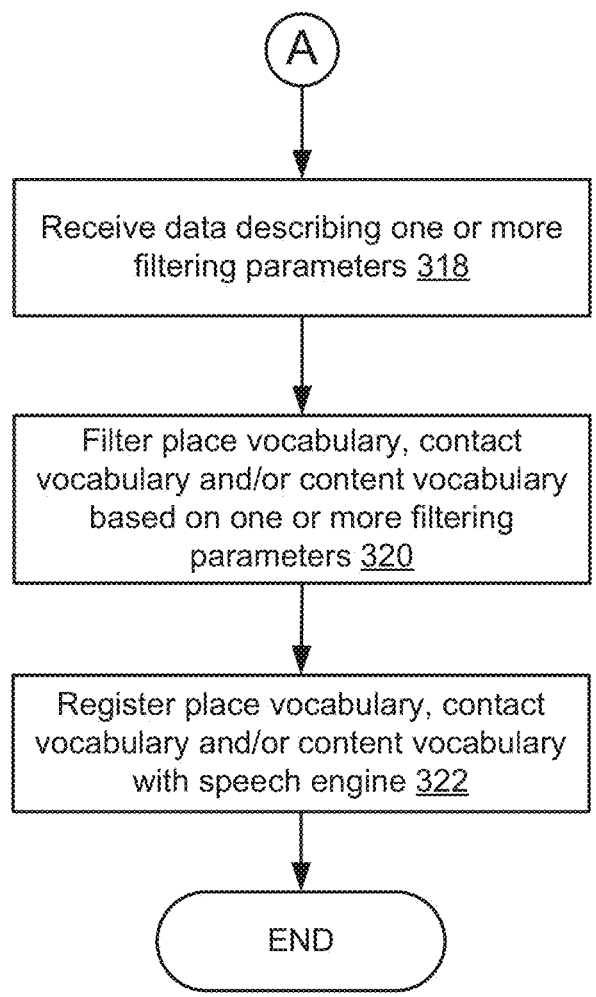

FIGS. 3A and 3B are flowcharts of an example method 300 for generating custom vocabularies for personalized speech recognition. Referring to FIG. 3A, the controller 202 can receive 302 social network data associated with a user from the social network server 120. The controller 202 can receive 304 search data associated with the user from the search server 124. The controller 202 can receive 306 navigation data associated with the user from the mobile computing system 135 and/or the client device 115. The place module 204 can populate 308 a place vocabulary associated with the user based on the social network data, the search data and/or the navigation data. The controller 202 can receive 310 contact data from the user's address book stored on a device associated with the user such as the client device 115 or the mobile computing system 135. The contact module 206 can populate 312 a contact vocabulary associated with the user based on the contact data and/or the social network data. The controller 202 can receive 314 content data from a device associated with the user such as the client device 115 or the mobile computing system 135. The content module 207 can populate 316 a content vocabulary associated with the user based on the content data, the social network data and/or the search data.

Referring to FIG. 3B, the controller 202 can receive 318 data describing one or more filtering parameters. For example, the controller 202 can receive data describing one or more content filtering parameters, one or more place filtering parameters and/or one or more contact filtering parameters. The filter module 216 can filter 320 the place vocabulary, the contact vocabulary and/or the content vocabulary based on the one or more filtering parameters. The registration module 208 can register 322 the filtered place vocabulary, the filtered contact vocabulary and/or the filtered content vocabulary with the speech engine 162.

Figure 4A:
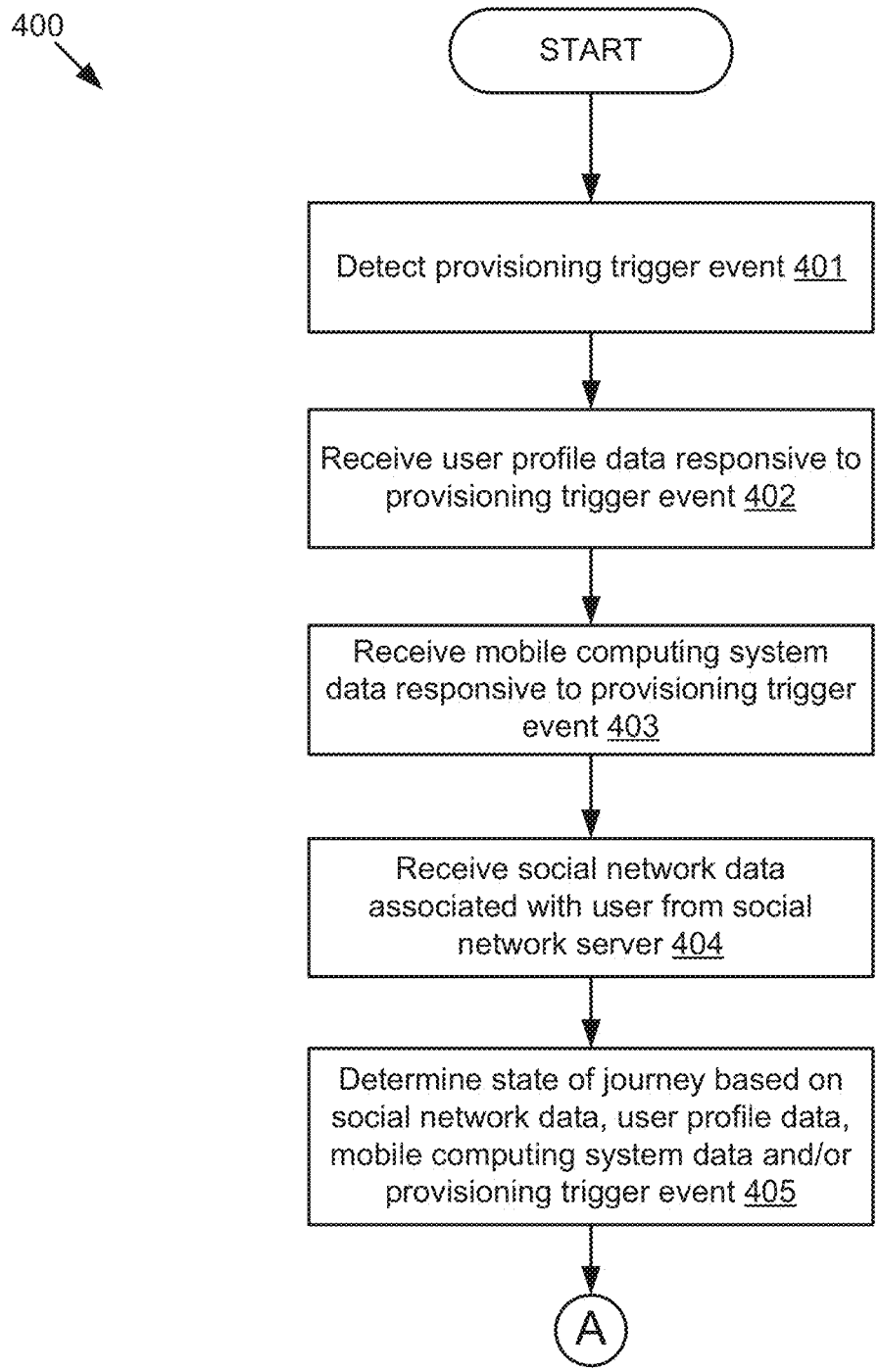
FIGS. 4A-4C are flowcharts of an example method for configuring a place vocabulary for personalized speech recognition.
Figure 4B:
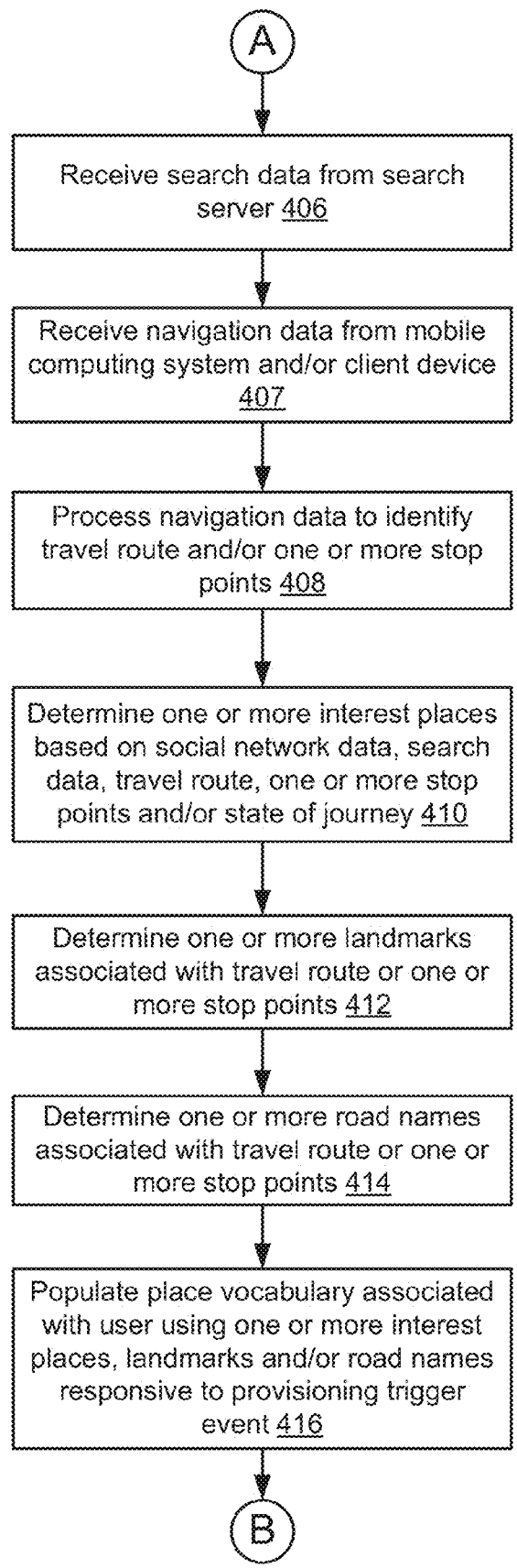
Figure 4C:
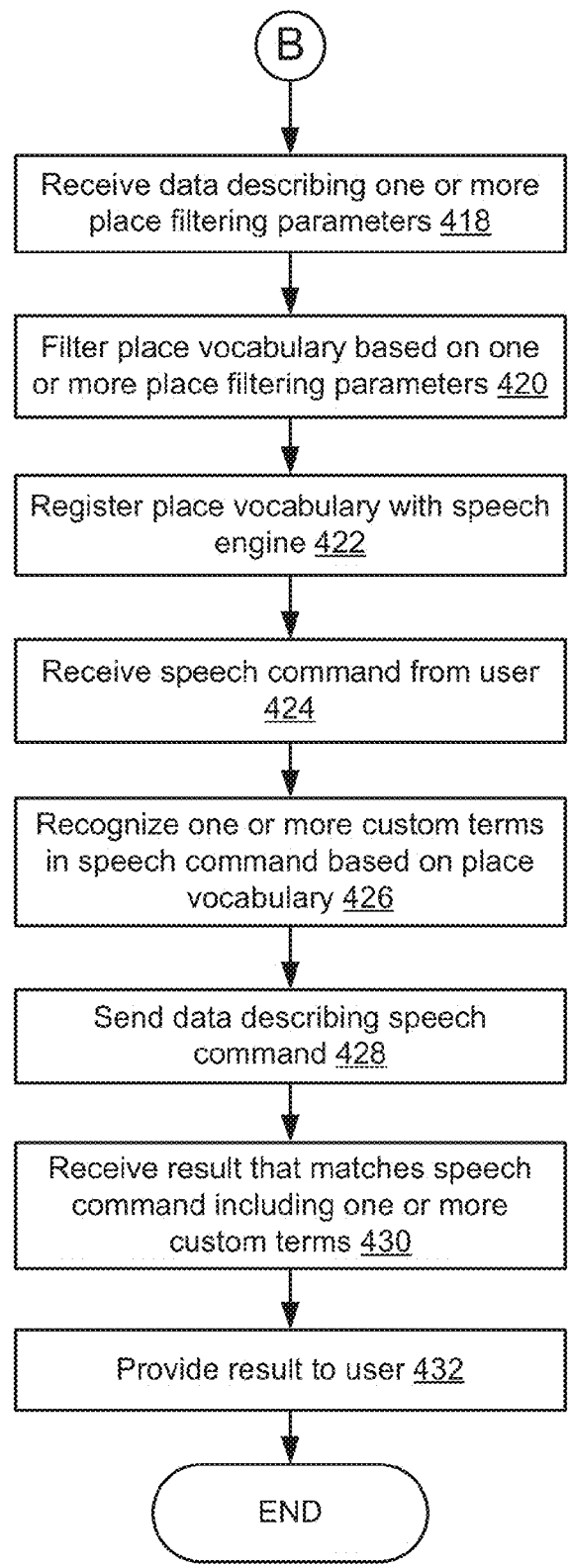

FIGS. 4A-4C are flowcharts of an example method 400 for generating a place vocabulary for personalized speech recognition. Referring to FIG. 4A, the registration module 208 can detect 401 a provisioning trigger event. The controller 202 can receive 402 user profile data associated with a user responsive to the provisioning trigger event. The controller 202 can receive 403 mobile computing system data associated with the user's mobile computing system 135 responsive to the provisioning trigger event. The controller 202 can receive 404 social network data associated with the user from the social network server 120. The journey state module 203 can determine 405 a state of a journey based on the social network data, the user profile data, the mobile computing system data and/or the provisioning trigger event.

Referring to FIG. 4B, the controller 202 can receive 406 social network data associated with a user from the social network server 120. The controller 202 can receive 407 search data associated with the user from the search server 124. The controller 202 can receive 408 navigation data associated with the user from another entity of the system 100, such as the second navigation application 107 stored on the mobile computing system 135 and/or the first navigation application 117 stored on the client device 115. The place module 204 can process 408 the navigation data to identify a travel route and/or one or more stop points. The place module 204 can determine 410 one or more interest places based on the social network data, the search data, the travel route, the one or more stop points and/or the state of the journey. The place module 204 can determine 412 one or more landmarks associated with the travel route, the one or more stop points and/or the state of the journey. The place module 204 can determine 414 one or more road names associated with the travel route, the one or more stop points and/or the state of the journey. The place module 204 can populate 416 a place vocabulary associated with the user using the one or more interest places, the one or more landmarks and/or the one or more road names responsive (e.g., directly or indirectly) to the provisioning trigger event.

Referring to FIG. 4C, the controller 202 can receive 418 data describing one or more place filtering parameters. The filter module 216 can filter 420 the place vocabulary based on the one or more place filtering parameters. The registration module 208 can register 422 the place vocabulary with the speech engine 162. The controller 202 can receive 424 a speech command from the user. The speech module 210 can recognize 426 one or more custom terms in the speech command based on the place vocabulary. The controller 202 can send 428 data describing the speech command including the one or more custom terms to the speech engine 162. The controller 202 can receive 430 a result that matches the speech command including the one or more custom terms. The presentation module 212 can provide 432 the result to the user.

Figure 5A:
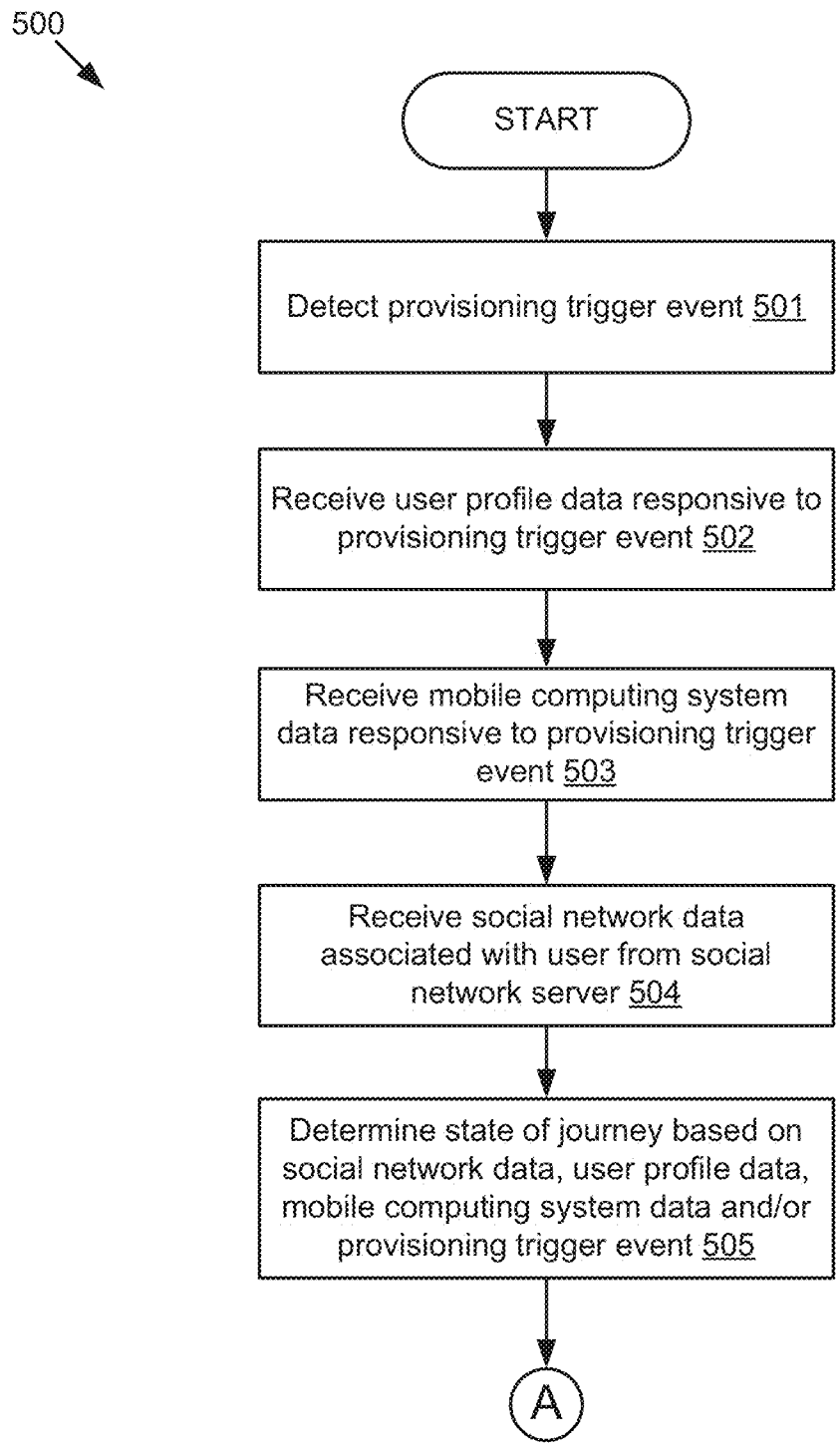
FIGS. 5A-5C are flowcharts of an example method for configuring a contact vocabulary for personalized speech recognition.
Figure 5B:
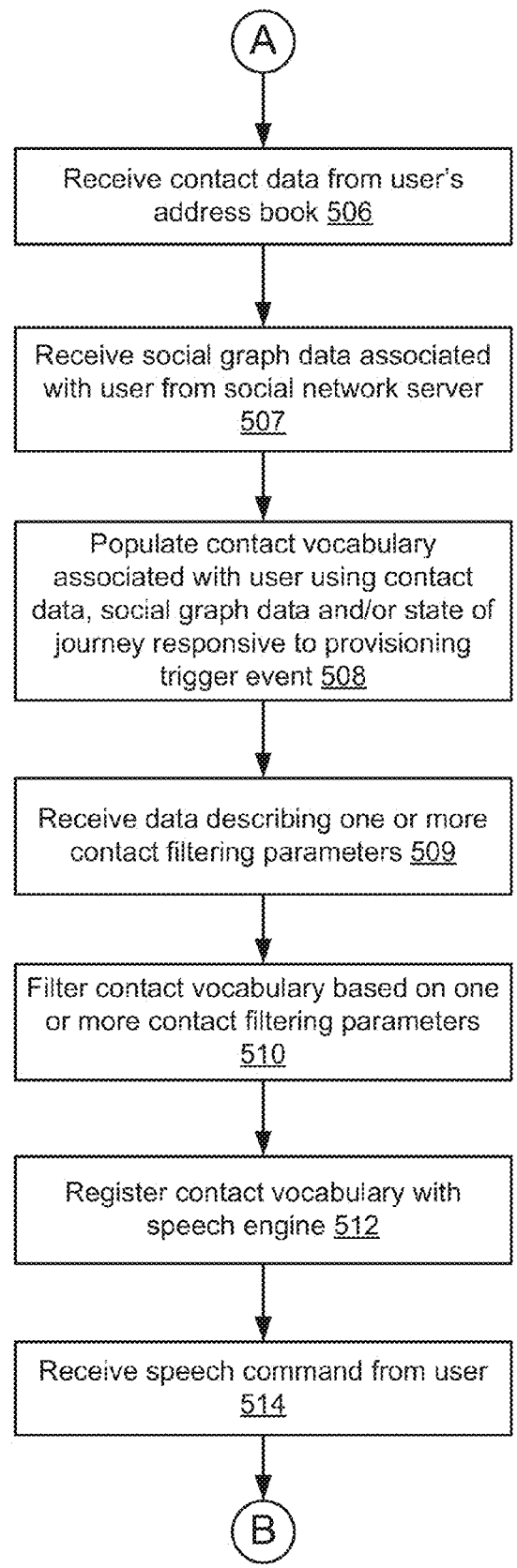
Figure 5C:
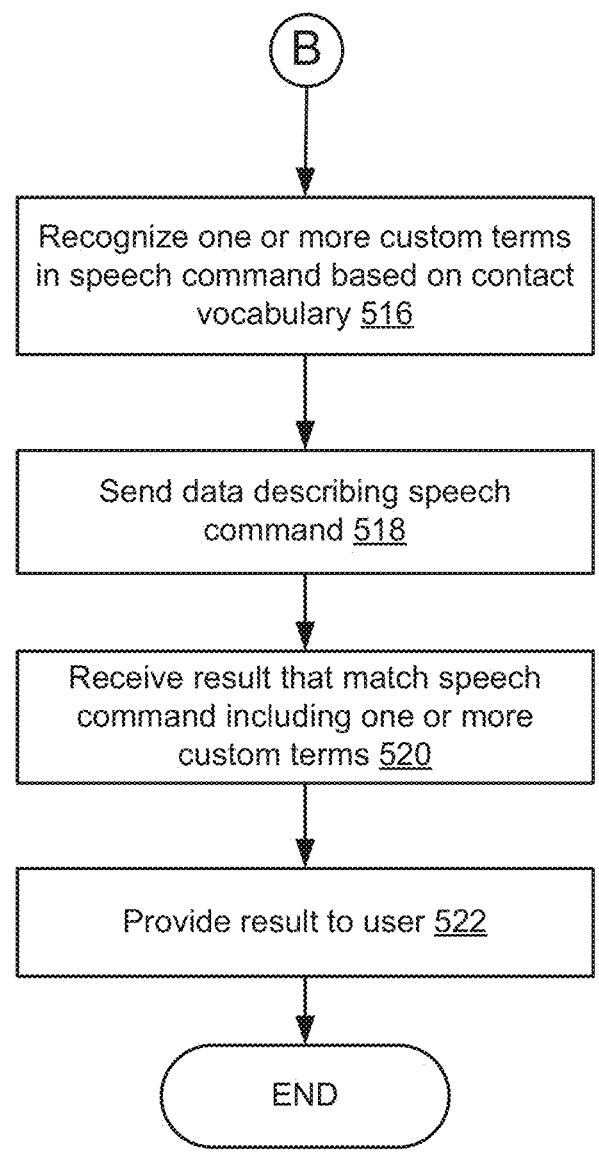

FIGS. 5A-5C are flowcharts of an example method 500 for generating a contact vocabulary for personalized speech recognition. Referring to FIG. 5A, the registration module 208 can detect 501 a provisioning trigger event. The controller 202 can receive 502 user profile data associated with a user responsive to the provisioning trigger event. The controller 202 can receive 503 mobile computing system data associated with the user's mobile computing system 135 responsive to the provisioning trigger event. The controller 202 can receive 504 social network data associated with the user from the social network server 120. The journey state module 203 can determine 505 a state of a journey based on the social network data, the user profile data, the mobile computing system data and/or the provisioning trigger event.

Referring to FIG. 5B, the controller 202 can receive 506 contact data from a user's address book stored on one or more devices associated with the user such as the mobile computing system 135 and/or the client device 115. The controller 202 can receive 507 social graph data associated with the user from the social network server 120. The contact module 206 can populate 508 a contact vocabulary associated with the user using the contact data, the social graph data and/or the state of the journey responsive (e.g., directly or indirectly) to the provisioning trigger event. The controller 202 can receive 509 data describing one or more contact filtering parameters. The filter module 216 can filter 510 the contact vocabulary based on the one or more contact filtering parameters. The registration module 208 can register 512 the contact vocabulary with the speech engine 162. The controller 202 can receive 514 a speech command from the user.

Referring to FIG. 5C, the speech module 210 can recognize 516 one or more custom terms in the speech command based on the contact vocabulary. The controller 202 can send 518 data describing the speech command including the one or more custom terms to the speech engine 162. The controller 202 can receive 520 a result that matches the speech command including the one or more custom terms. The presentation module 212 can provide 522 the result to the user.

Figure 6A:
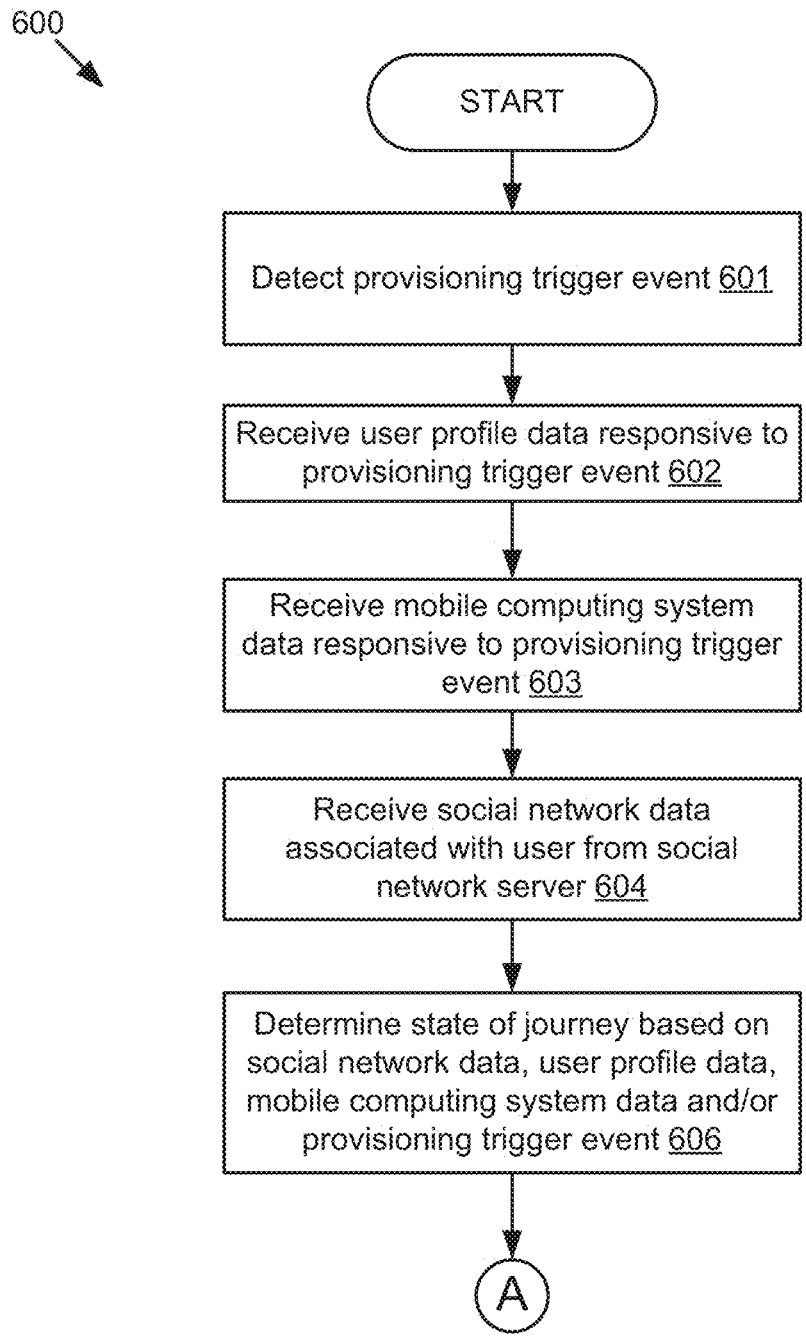
FIGS. 6A-6C are flowcharts of an example method for configuring a content vocabulary for personalized speech recognition.
Figure 6B:
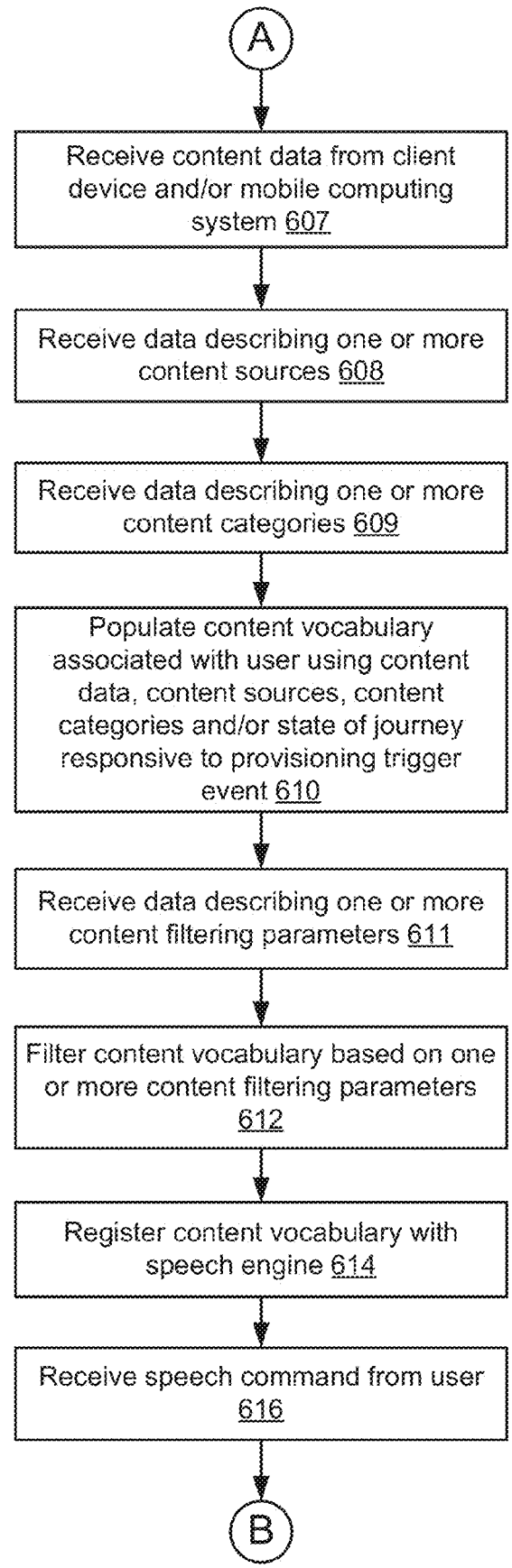
Figure 6C:
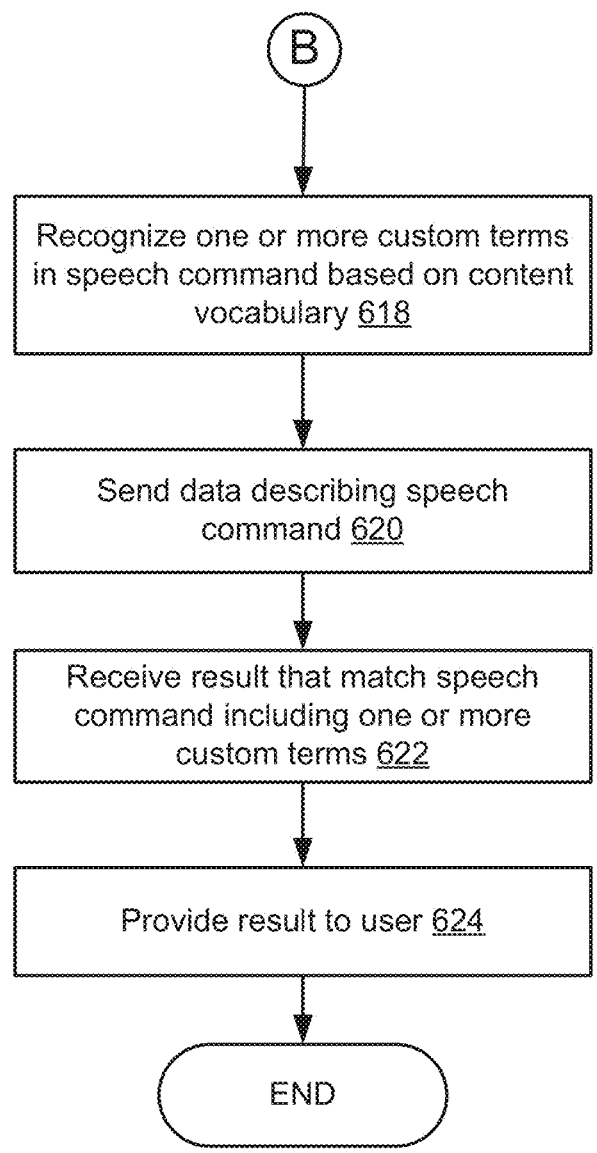

FIGS. 6A-6C are flowcharts of an example method 600 for generating a content vocabulary for personalized speech recognition. Referring to FIG. 6A, the registration module 208 can detect 601 a provisioning trigger event. The controller 202 can receive 602 user profile data associated with a user responsive to the provisioning trigger event. The controller 202 can receive 603 mobile computing system data associated with the user's mobile computing system 135 responsive to the provisioning trigger event. The controller 202 can receive 604 social network data associated with the user from the social network server 120. The journey state module 203 can determine 605 a state of a journey based on the social network data, the user profile data, the mobile computing system data and/or the provisioning trigger event.

Referring to FIG. 6BB, the controller 202 can receive 607 content data describing one or more content items from one or more devices associated with the user such as the client device 115 and/or the mobile computing system 135. The controller 202 can receive 608 data describing one or more content sources from one or more devices associated with the user such as the client device 115 and/or the mobile computing system 135. The controller 202 can receive 609 data describing one or more content categories from one or more devices associated with the user such as the client device 115 and/or the mobile computing system 135. The content module 207 can populate 610 a content vocabulary associated with the user using the content data, the one or more content sources, the one or more content categories and/or the state of the journey responsive (e.g., directly or indirectly) to the provisioning trigger event. The controller 202 can receive 611 data describing one or more content filtering parameters. The filter module 216 can filter 612 the content vocabulary based on the one or more content filtering parameters. The registration module 208 can register 614 the content vocabulary with the speech engine 162. The controller 202 can receive 616 a speech command from the user.

Referring to FIG. 6C, the speech module 210 can recognize 618 one or more custom terms in the speech command based on the content vocabulary. The controller 202 can send 620 data describing the speech command including the one or more custom terms to the speech engine 162. The controller 202 can receive 622 a result that matches the speech command including the one or more custom terms. The presentation module 212 can provide 624 the result to the user.

Figure 7:
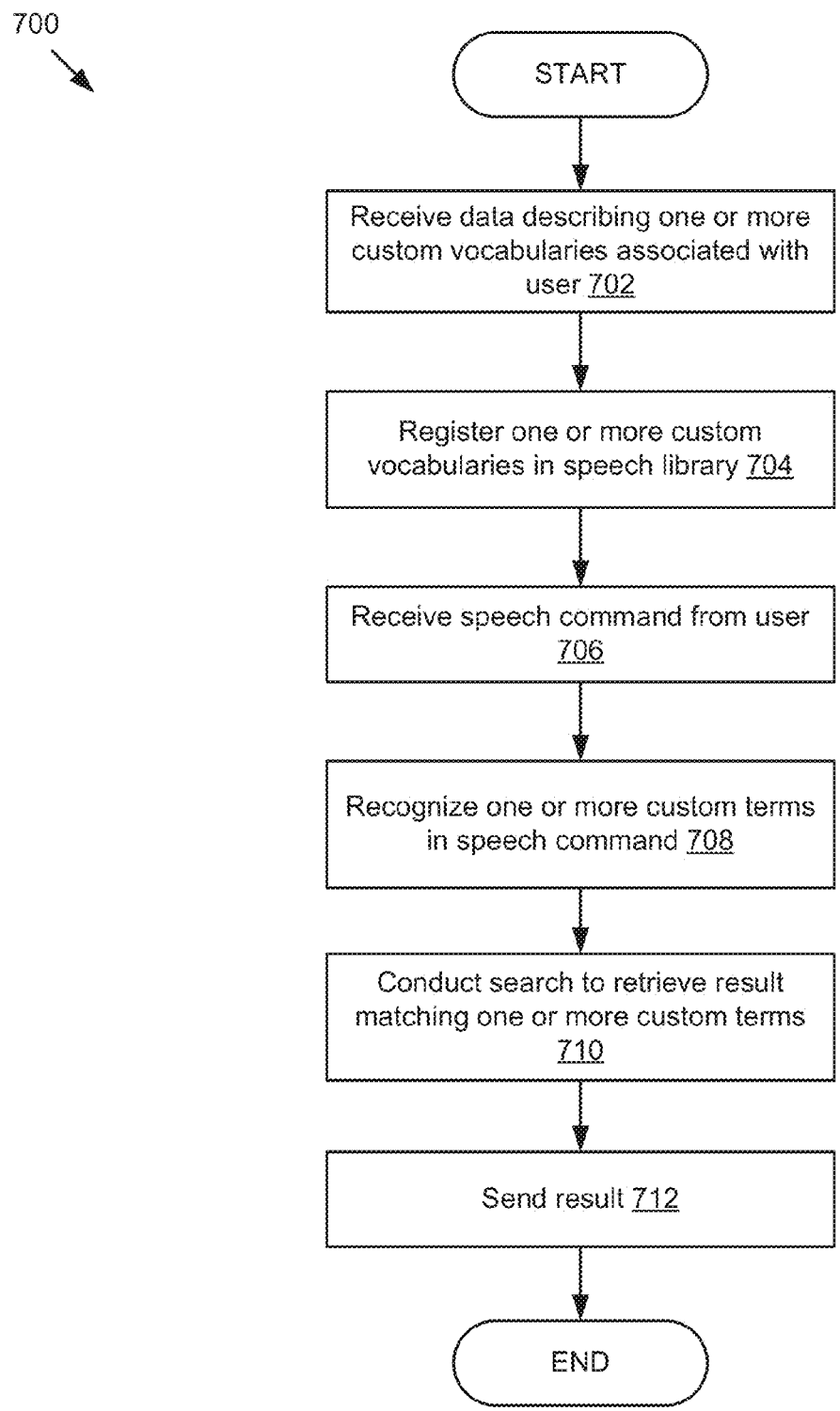
FIG. 7 is a flowchart of an example method for conducting a search using personalized speech recognition.

FIG. 7 is a flowchart of an example method 700 for conducting a speech search using personalized speech recognition. In some embodiments, the speech engine 162 can receive 702 data describing one or more custom vocabularies associated with a user from the recognition application 109. The registration application 164 can register 704 the one or more custom vocabularies with the speech engine 162. The speech engine 162 can receive 706 a speech command from the user. In some embodiments, the speech engine 162 can receive a speech command from the recognition application 109. The speech engine 162 can recognize 708 one or more custom terms in the speech command. The speech engine 162 can conduct 710 a search to retrieve a result that matches the speech command including the one or more custom terms. The speech engine 162 can send 712 the result to the recognition application 109 for presentation to the user.

Graphic Representations

Figure 8A:
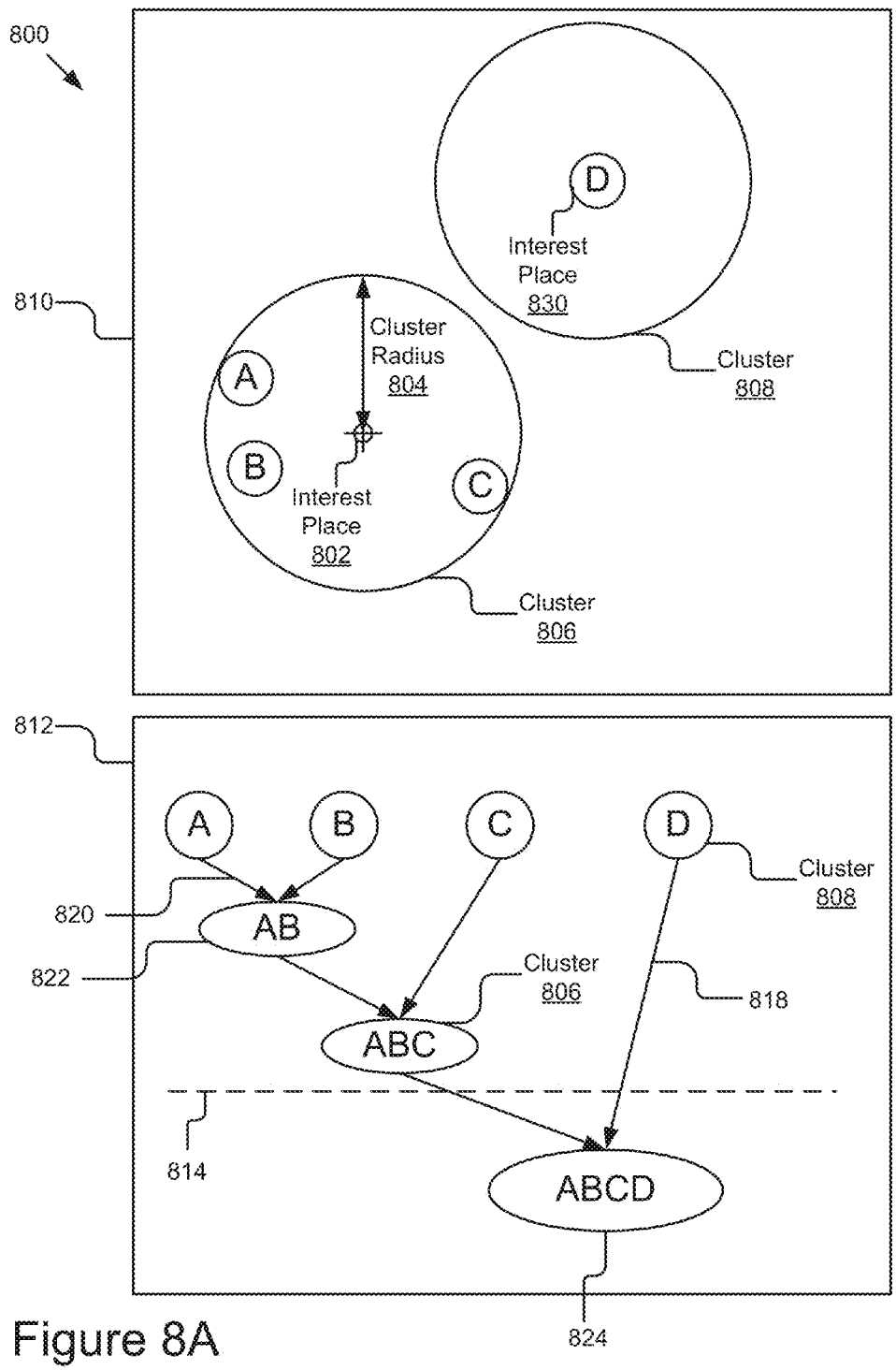
FIGS. 8A and 8B are graphic representations illustrating example clustering processes to determine interest places.
Figure 8B:
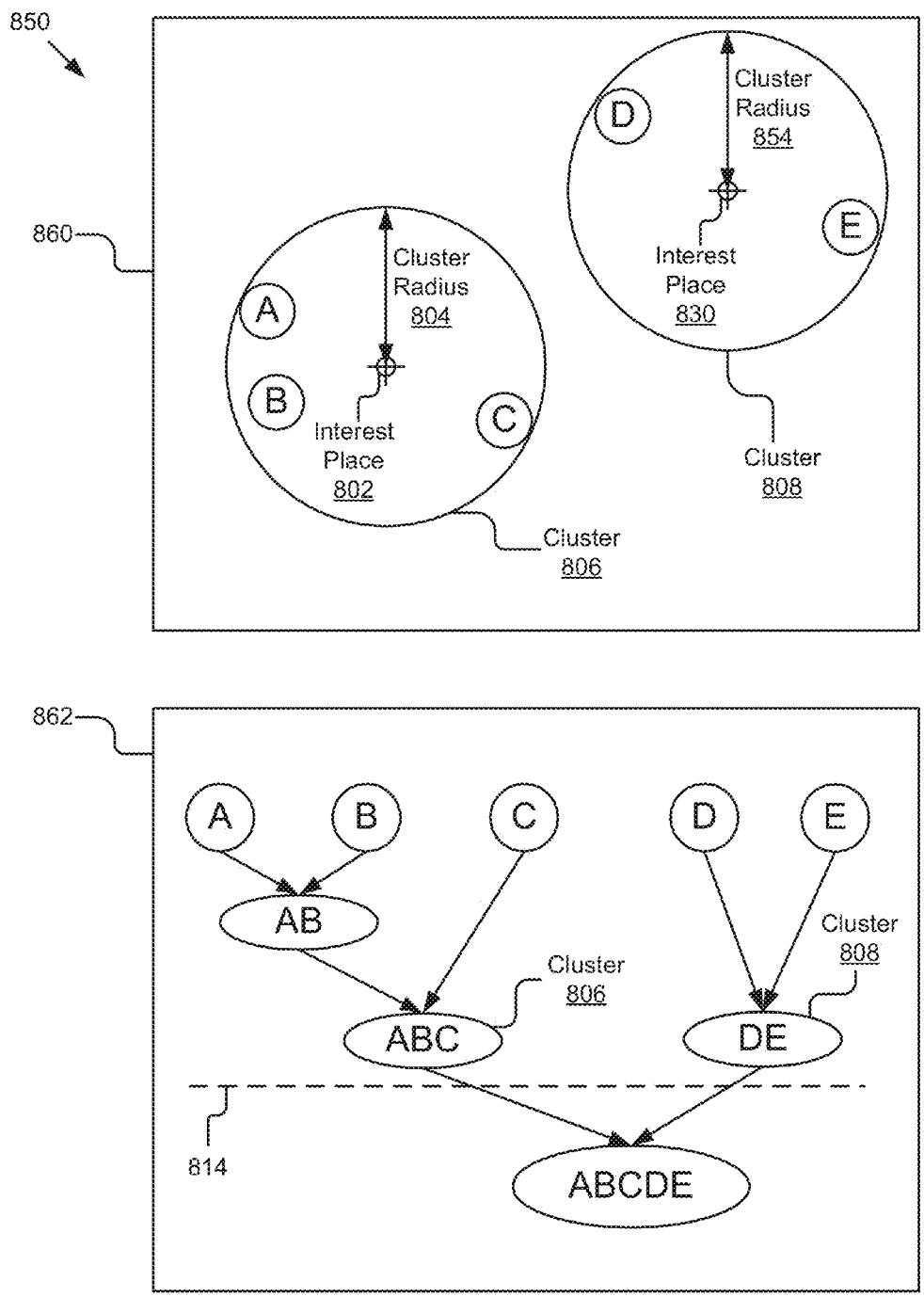

FIGS. 8A and 8B are graphic representations 800 and 850 illustrating example clustering processes to determine interest places. In some embodiments, the place module 204 can determine one or more locations visited by a user based on navigation data associated with the user. For example, the place module 204 can determine one or more stop points or destinations using GPS logs associated with the user. The place module 204 can configure a cluster radius for a cluster based on a geographic characteristic associated with the one or more visited locations. For example, a cluster radius in a downtown area can be smaller than a cluster radius in a suburban area. In some embodiments, the place module 204 determines a cluster radius using heuristic techniques. In additional embodiments, a cluster radius can be configured by an administrator of the computing device 200.

A cluster can be a geographic region that includes one or more locations and/or places visited by a user. For example, one or more locations and/or places visited by a user can be grouped together to form a cluster, where the one or more locations and/or places are located within a particular geographic region such as a street block. In some examples, a cluster can be associated with an interest place that is used to represent all the places or locations visited by the user within the cluster. In some embodiments, the center point of the cluster can be configured as an interest place associated with the cluster, and the cluster is a circular area determined by the center point and the radius. In other examples, a cluster can be of a rectangular shape, a square shape, a triangular shape or any other geometric shape.

The place module 204 can determine whether the one or more locations visited by the user are within a cluster satisfying a configured cluster radius. If the one or more visited locations are within the cluster satisfying the cluster radius, the place module 204 may group the one or more visited locations into a single cluster and determine the center point of the cluster as an interest place associated with the cluster. For example, the interest place associated with the cluster has the same longitude, latitude and altitude as the center point of the cluster.

In some embodiments, the place module 204 can determine a plurality of locations visited by the user based on the navigation data associated with the user. The place module 204 can group the plurality of locations into one or more clusters so that each cluster includes one or more visited locations. For example, the place module 204 can apply an agglomerative clustering approach (a hierarchical clustering with a bottom-up approach) to group the plurality of locations into one or more clusters. The agglomerative clustering approach is illustrated below with reference to at least FIGS.

8A-8B. The place module 204 can generate one or more interest places as one or more center points of the one or more clusters. In some embodiments, the one or more clusters have the same cluster radius. In additional embodiments, the one or more clusters have different cluster radii.

Referring to FIG. 8A, a box 810 depicts 4 locations A, B, C, D that are visited by a user. The place module 204 can group the locations A, B and C into a cluster 806 that has a cluster radius 804. The place module 204 can generate an interest place 802 that is a center point of the cluster 806. Because the location D is not located within the cluster 806, the place module 204 can group the location D into a cluster 808. The cluster 808 has a single location visited by the user (the location D) and the center point of the cluster 808 is configured to be the location D. The place module 204 can generate another interest place 830 associated with the user that is the center point of the cluster 808.

A dendrogram corresponding to the clustering process illustrated in the box 810 is depicted in a box 812. A dendrogram can be a tree diagram used to illustrate arrangement of clusters produced by hierarchical clustering. The dendrogram depicted in the box 812 illustrates an agglomerative clustering method (e.g., a hierarchical clustering with a bottom-up approach). The nodes in the top row of the dendrogram represent the locations A, B, C, D visited by the user. The other nodes in the dendrogram represent clusters merged at different levels.

For illustrative purposes only, in some embodiments a length of a connecting line between two nodes in the dendrogram may indicate a measure of dissimilarity between the two nodes. A longer connecting line indicates a larger measure of dissimilarity. For example, line 818 is longer than line 820, indicating the measure of dissimilarity between the place D and the node 824 is greater than that between the place A and the node 822. In some examples, the dissimilarity between two nodes can be measured using one of a Euclidean distance, a squared Euclidean distance, a Manhattan distance, a maximum distance, a Mahalanobis distance and a cosine similarity between the two nodes. Other example measures of dissimilarity are possible.

As illustrated in the box 812, the dendrogram can be partitioned at a level represented by line 814, and the cluster 806 (including the locations A, B and C) and the cluster 808 (including the location D) can be generated. The partition level can be determined based at least in part on the cluster radius.

Referring to FIG. 8B, the user also visits a location E. A box 860 depicts the cluster 806 with the cluster radius 804 and an updated cluster 808 with a cluster radius 854. In some embodiments, the cluster radius 804 has the same value as the cluster radius 854. In additional embodiments, the cluster radius 804 has a different value from the cluster radius 854. The cluster 806 includes the locations A, B and C. The place module 204 can update the cluster 808 to include the locations D and E. The place module 204 can update the interest place 830 to be the center point of the updated cluster 808. A dendrogram corresponding to the box 860 is illustrated in a box 862. In this example, the dendrogram may be partitioned at a level represented by line 814, and the cluster 806 (including the locations A, B and C) and the cluster 808 (including the location D and E) can be generated. The partition level can be determined based at least in part on the cluster radius.

FIG. 9A is a graphic representation 900 illustrating example custom vocabularies associated with a user. The graphic representation 900 includes an example contact vocabulary 902, an example place vocabulary 904 and an example content vocabulary 906. The recognition application 109 can register the contact vocabulary 902, the place vocabulary 904 and/or the content vocabulary 906 with the speech engine 162.

Figure 9B:
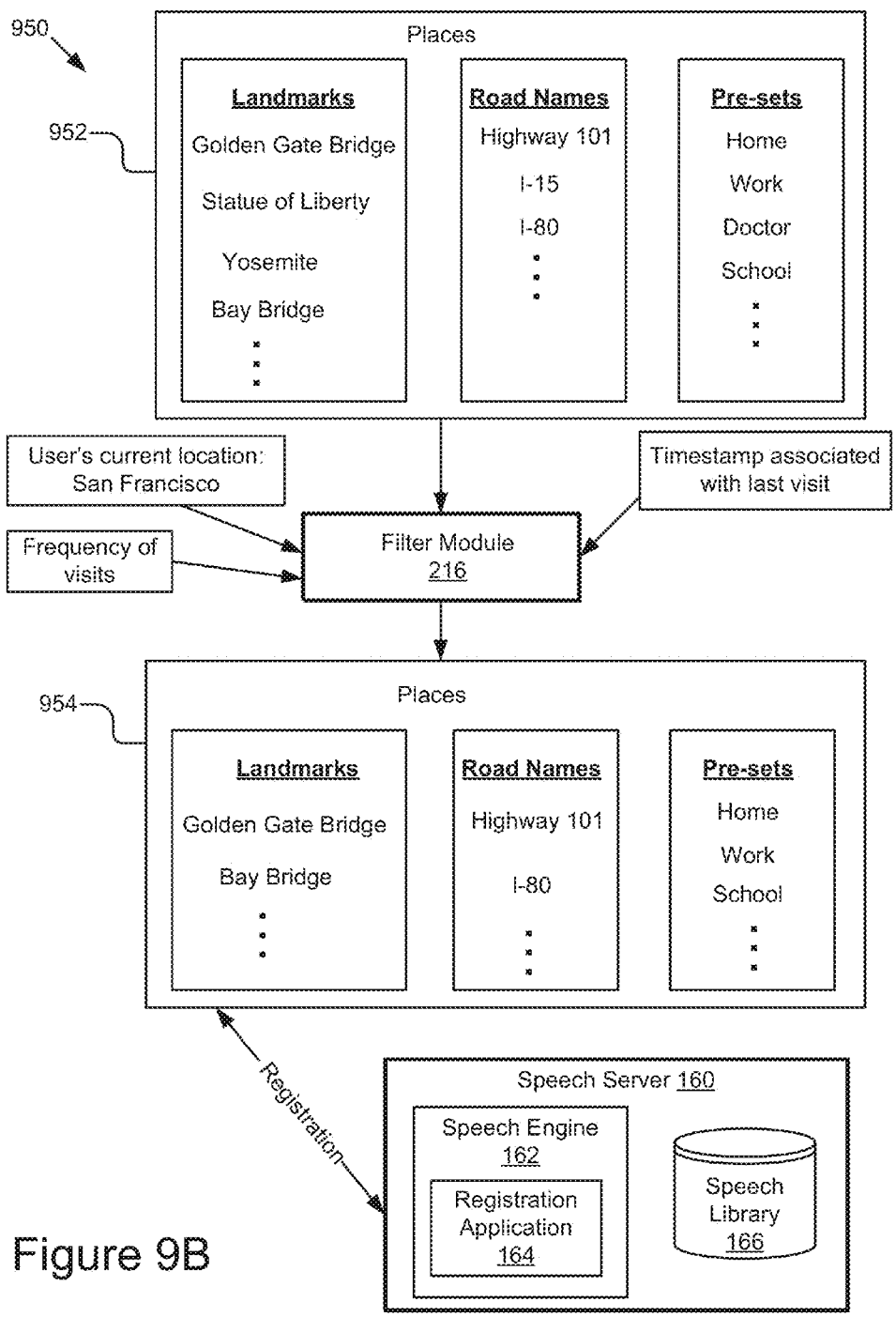
FIGS. 9B and 9C are graphic representations illustrating various example filtering processes for filtering place vocabularies.
Figure 9C:
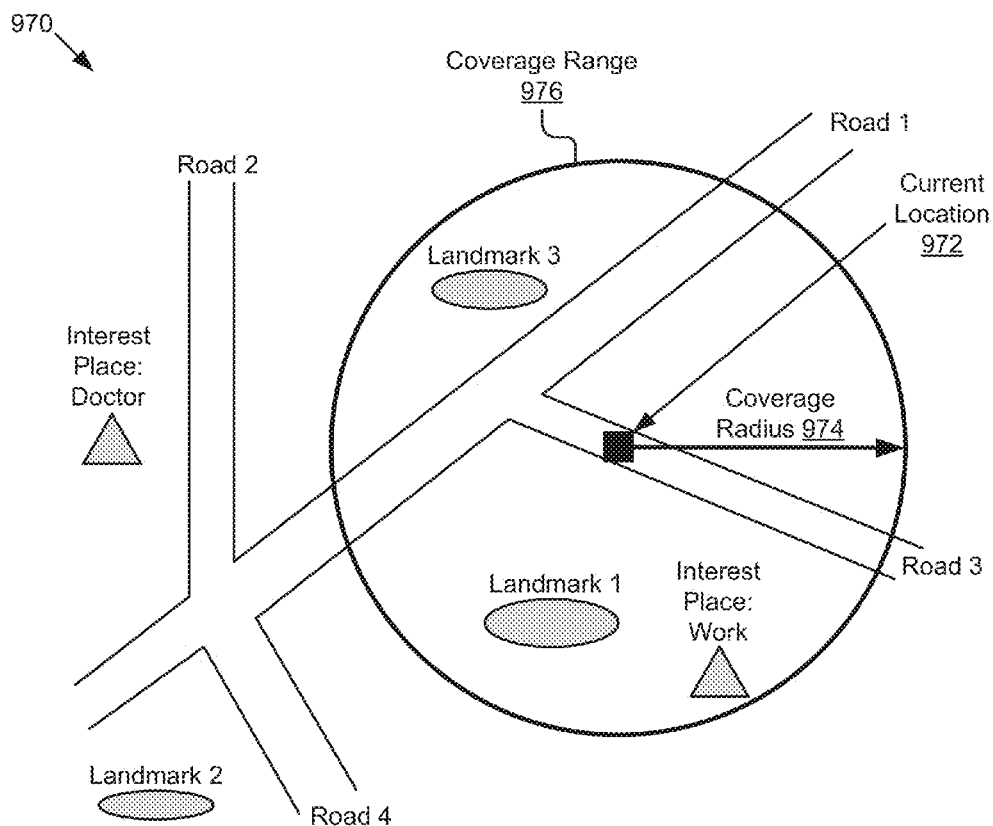
Figure 9C:
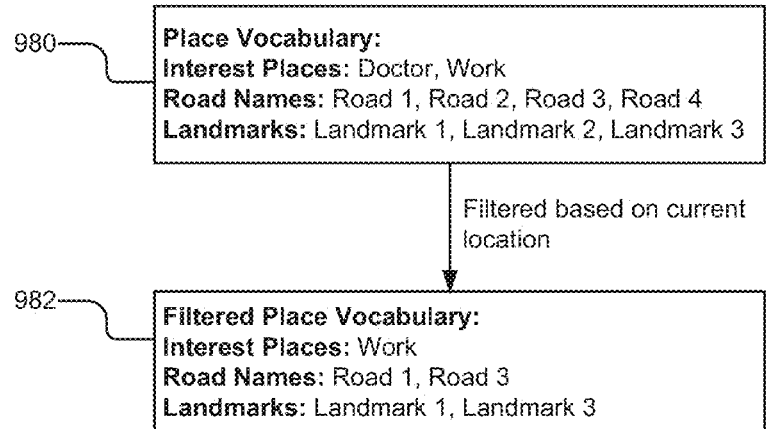

FIGS. 9B and 9C are graphic representations 950 and 970 illustrating various example filtering processes for filtering place vocabularies. Referring to FIG. 9B, the filter module 216 can filter an example place vocabulary 952 based on the user's current location at a specific location (e.g., San Francisco), frequencies of visits to locations corresponding to custom place terms in the place vocabulary 952 (e.g., a total number of visits to the landmarks, roads and pre-set interest places) and/or timestamps of last visit to the locations corresponding to the custom place terms. The filter module 216 can generate a filtered place vocabulary 954. For example, because the user is currently in San Francisco, the filter module 216 can remove interest places "Statue of Liberty," "Yosemite" and the road "I-15" from the place vocabulary 952 to generate the filtered place vocabulary 954 that matches the user's current location. Because the user does not pay visits to the doctor recently, the filter module 216 can also remove the pre-set interest place "doctor" from the place vocabulary 952. The registration module 208 can register the filtered place vocabulary 954 with the speech engine 162.

Referring to FIG. 9C, the filter module 216 can determine a coverage radius 974 for a coverage range 976. The filter module 216 can configure the center point for the coverage range 976 as a current location 972 of a user. An example place vocabulary 980 includes interest places ("Work" and "Doctor"), landmarks ("Landmark 1," "Landmark 2" and "Landmark 3") and roads ("Road 1," "Road 2," "Road 3" and "Road 4") which are depicted in the graphic representation 970. The filter module 216 can filter the place vocabulary 980 based on the current location 972 and the coverage range 976. Since the coverage range 976 covers the interest place "Work," landmarks "Landmark 1" and "Landmark 3" and roads "Road 1" and "Road 3," the filter module 216 can generate a filtered place vocabulary 982 that includes the interest place "Work," landmarks "Landmark 1" and "Landmark 3" and roads "Road 1" and "Road 3."

Figure 10A:
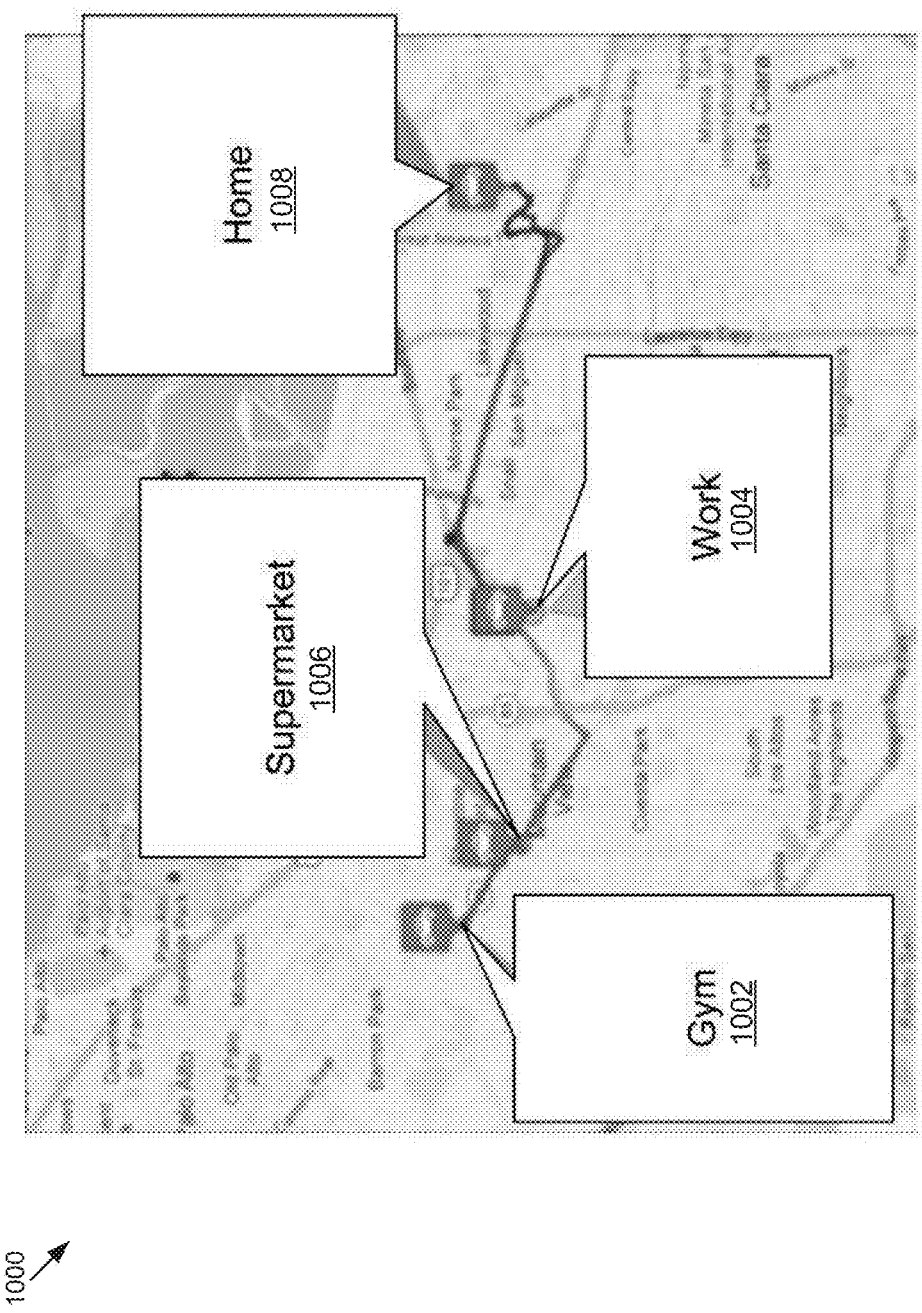
FIG. 10A is a graphic representation illustrating example navigation data associated with a user.

FIG. 10A is a graphic representation 1000 illustrating example navigation data associated with a user. The example navigation data includes GPS traces received from a navigation application such as the first navigation application 117 stored in the client device 115 or the second navigation application 107 stored in the mobile computing system 135. The GPS traces describe journeys taken by the user on a particular day. The recognition application 109 can determine interest places (e.g., gym 1002, supermarket 1006, work 1004, home 1008) based on the navigation data. The recognition application 109 can also determine road names for roads that form part of the GPS traces or intersect the GPS traces. The recognition application 109 can add the interest places and/or the road names to a place vocabulary associated with the user.

Figure 10B:
FIGS. 10B-10F are graphic representations illustrating various example results using personalized speech recognition.
Figure 10C:
Figure 10D:
Figure 10D:
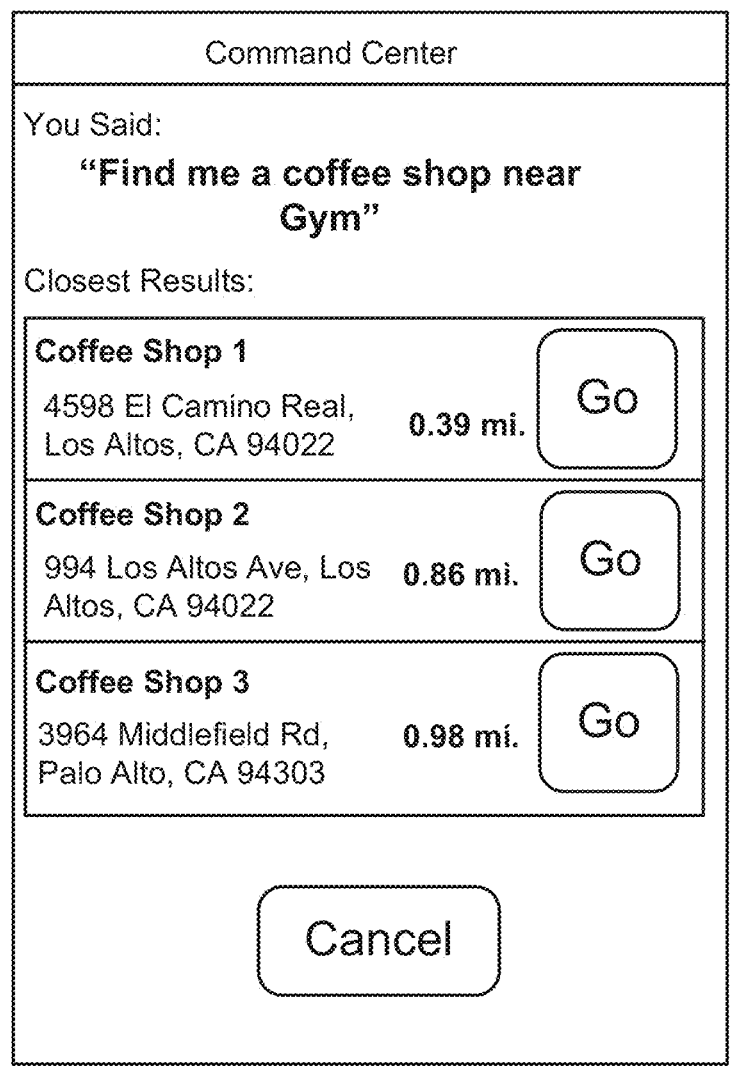
Figure 10E:
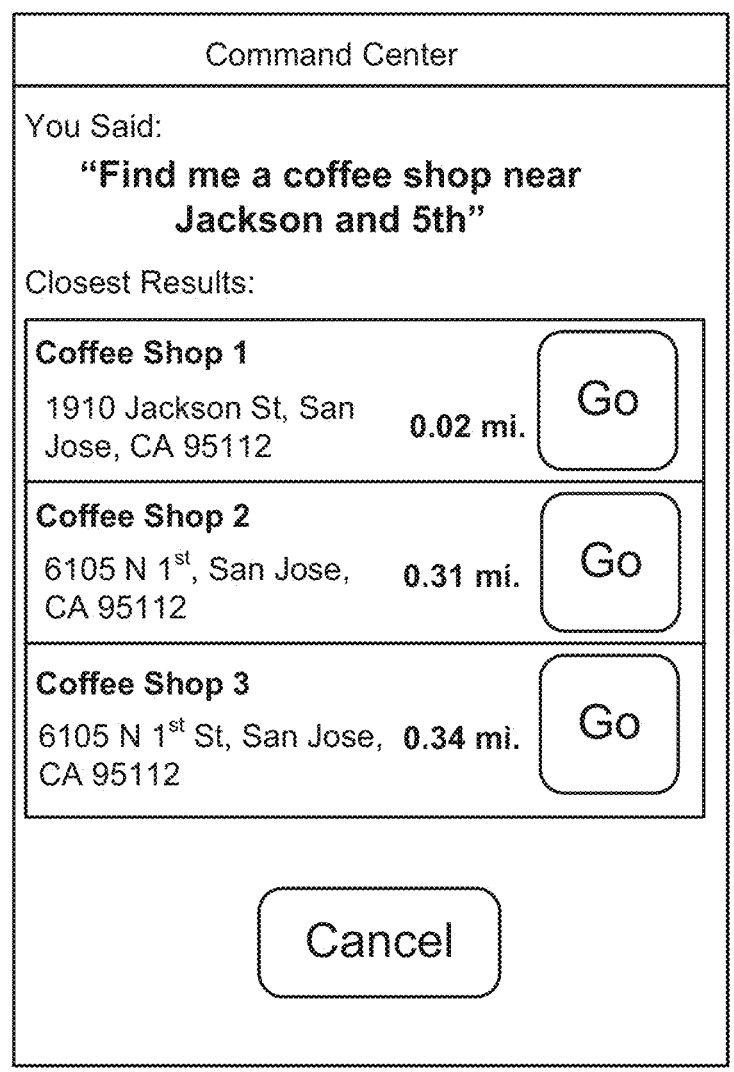
Figure 10F:
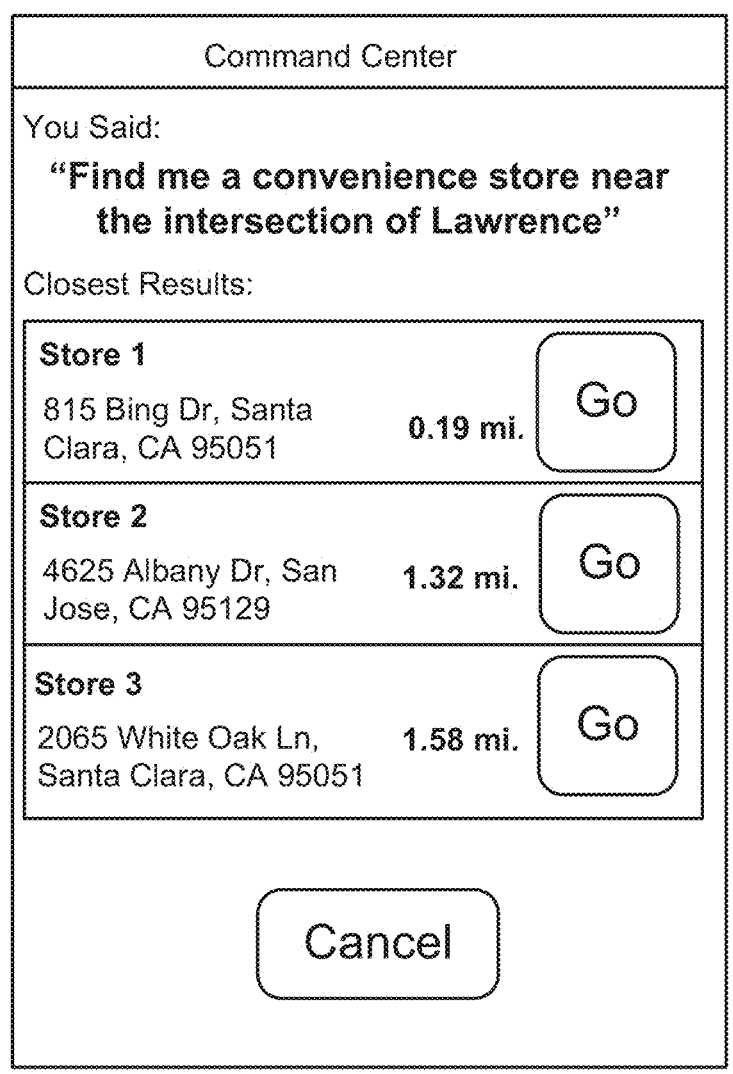

FIGS. 10B-10F are graphic representations 1010, 1020, 1030, 1040 and 1050 illustrating various example results using personalized speech recognition. FIG. 10B illustrates a result matching a speech command "find me a coffee shop near home" that includes a particular interest place "home" customized for the user. FIG. 10C illustrates a result matching a speech command "find me a coffee shop near supermarket" that includes a particular interest place "supermarket" customized for the user. FIG. 10D illustrates a result matching a speech command "find me a coffee shop near gym" that includes a particular interest place "gym" customized for the user. FIG. 10E illustrates a result matching a speech command "find me a coffee shop near Jackson and 5th" that includes road names "Jackson" and "5th." FIG. 10F illustrates a result matching a speech command "find me a convenience store near the intersection of Lawrence" that includes a road name "Lawrence." The system 100 can rapidly provide these personalized results because of the custom vocabularies and filtering described above.

In the above description, for purposes of explanation, numerous specific details are set forth in order to provide a thorough understanding of the specification. It will be apparent, however, to one skilled in the art that the disclosure can be practiced without these specific details. In other implementations, structures and devices are shown in block diagram form in order to avoid obscuring the description. For example, the present implementation is described in one implementation below primarily with reference to user interfaces and particular hardware. However, the present implementation applies to any type of computing device that can receive data and commands, and any peripheral devices providing services.

Reference in the specification to "one implementation" or "an implementation" means that a particular feature, structure, or characteristic described in connection with the implementation is included in at least one implementation of the description. The appearances of the phrase "in one implementation" in various places in the specification are not necessarily all referring to the same implementation.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present implementation of the specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware implementation, an entirely software implementation or an implementation containing both hardware and software elements. In a preferred implementation, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the implementations of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   detecting a provisioning trigger event;
   determining a state of a journey associated with a user based on the provisioning trigger event;
   determining one or more interest places based on the state of the journey;
   populating a place vocabulary associated with the user using the one or more interest places;
   filtering the place vocabulary based on one or more place filtering parameters including a first location associated with the user, the filtering the place vocabulary including determining a size of the place vocabulary, configuring a size of a coverage range associated with the first location based on the size of the place vocabulary, and generating the filtered place vocabulary that includes one or more custom place terms corresponding to one or more second locations within the coverage range;
   registering the filtered place vocabulary for the user;
   receiving a speech command from the user;
   recognizing the one or more custom place terms in the speech command based on the registered place vocabulary;
   sending data describing the speech command that includes the one or more custom place terms; and
   receiving a result that matches the speech command including the one or more custom place terms.

2. The method of claim 1, wherein
   the filtered place vocabulary is registered with a speech engine,
   the speech command is received from the user via a microphone associated with a computing device and coupled to the speech engine,
   the data describing the speech command is sent to the speech engine,
   the result that matches the speech command is received from the speech engine, and
   the method further comprises:
      providing the result to the user via an output device associated with the computing device.

3. The method of claim 1, further comprising:
   receiving navigation data associated with the user;
   processing the navigation data to identify a travel route and one or more stop points;
   determining one or more road names associated with the travel route;
   determining one or more landmarks associated with the travel route; and
   populating the place vocabulary further based on the one or more stop points, the one or more landmarks and the one or more road names.

4. The method of claim 1, further comprising:
   receiving social network data associated with the user; and
   determining the one or more interest places further based on location data included in the social network data.

5. The method of claim 4, further comprising:
   receiving search data associated with the user; and
   determining the one or more interest places further based on the search data.

6. The method of claim 1, further comprising:
   receiving contacts data associated with the user; and
   determining the one or more interest places further based on location data in the contacts data.

7. The method of claim 6, further comprising:
   receiving search data associated with the user; and
   determining the one or more interest places further based on the search data.

8. The method of claim 1, further comprising:
   receiving search data associated with the user; and
   determining the one or more interest places further based on the search data.

9. The method of claim 1, wherein:
   the journey includes a future journey;
   the state of the journey includes a journey start time for the future journey; and
   the place vocabulary is populated and registered before the journey start time.

10. A computer-implemented method comprising:
    detecting a provisioning trigger event;
    determining a state of a journey associated with a user based on the provisioning trigger event;
    receiving contact data describing one or more contacts associated with the user;
    receiving social graph data describing a social graph associated with the user;
    receiving location data associated with the user;
    populating a contact vocabulary associated with the user based on the contact data, the social graph data, contact information associated with the location data, and the state of the journey;
    computing a quality score for each contact term the contact vocabulary includes based on a relationship between the user and a contact represented by the contact term;
    comparing the quality score of each contact term to a quality threshold;
    retaining each contact term whose quality score satisfies the quality threshold and removing each contact term whose quality score does not satisfy the quality threshold to create a filtered contact vocabulary that includes custom contact terms;
    registering the filtered contact vocabulary for the user;
    receiving a speech command from the user;
    recognizing one or more custom contact terms in the speech command based on the registered contact vocabulary;
    sending data describing the speech command that includes the one or more custom contact terms; and
    receiving a result that matches the speech command including the one or more custom contact terms.

11. A computer-implemented method comprising:
    detecting a provisioning trigger event;
    determining a state of a journey associated with a user based on the provisioning trigger event;

receiving content data describing one or more content items;

receiving data describing one or more content sources;

populating a content vocabulary associated with a user based on the content data, the one or more content sources and the state of the journey;

computing a quality score for each content term the content vocabulary includes based on an interaction of the user with a content item represented by the content term;

comparing the quality score of each content term to a quality threshold;

retaining each content term whose quality score satisfies the quality threshold and removing each content term whose quality score does not satisfy the quality threshold to create a filtered content vocabulary that includes custom content terms;

registering the filtered content vocabulary for the user;

receiving a speech command from the user;

recognizing one or more custom content terms in the speech command based on the registered content vocabulary;

sending data describing the speech command that includes the one or more custom content terms; and receiving a result that matches the speech command including the one or more custom content terms.

12. A computer program product comprising a non-transitory computer usable medium including a computer readable program, wherein the computer readable program when executed on a computer causes the computer to:

detect a provisioning trigger event;

determine a state of a journey associated with a user based on the provisioning trigger event;

determine one or more interest places based on the state of the journey;

populate a place vocabulary associated with the user using the one or more interest places;

filter the place vocabulary based on one or more place filtering parameters including a first location associated with the user, to filter the place vocabulary including determining a size of the place vocabulary, configuring a size of a coverage range associated with the first location based on the size of the place vocabulary, and generating the filtered place vocabulary that includes one or more custom place terms corresponding to one or more second locations within the coverage range;

register the filtered place vocabulary for the user;

receive a speech command from the user;

recognize the one or more custom place terms in the speech command based on the registered place vocabulary;

send data describing the speech command that includes the one or more custom place terms; and receive a result that matches the speech command including the one or more custom place terms.

13. The computer program product of claim 12, wherein the filtered place vocabulary is registered with a speech engine, the speech command is received from the user via a microphone associated with a computing device and coupled to the speech engine, the data describing the speech command is sent to the speech engine, the result that matches the speech command is received from the speech engine, and the computer readable program when executed on the computer causes the computer to also:

provide the result to the user via an output device associated with the computing device.

14. The computer program product of claim 12, wherein the computer readable program when executed causes the computer to also:

receive navigation data associated with a user;

process the navigation data to identify a travel route and one or more stop points;

determine one or more road names associated with the travel route;

determine one or more landmarks associated with the travel route; and populate the place vocabulary further based on the one or more stop points, the one or more landmarks and the one or more road names.

15. The computer program product of claim 12, wherein the computer readable program when executed causes the computer to also:

receive social network data associated with the user; and determine the one or more interest places further based on location data included in the social network data.

16. The computer program product of claim 15, wherein the computer readable program when executed causes the computer to also:

receive search data associated with the user; and determine the one or more interest places further based on the search data.

17. The computer program product of claim 12, wherein the computer readable program when executed causes the computer to also:

receive contacts data associated with the user; and determine the one or more interest places further based on location data in the contacts data.

18. The computer program product of claim 17, wherein the computer readable program when executed causes the computer to also:

receive search data associated with the user; and determine the one or more interest places further based on the search data.

19. The computer program product of claim 12, wherein the computer readable program when executed causes the computer to also:

receive search data associated with the user; and determine the one or more interest places further based on the search data.

20. The computer program product of claim 12, wherein:

the journey includes a future journey;

the state of the journey includes a journey start time for the future journey; and the place vocabulary is populated and registered before the journey start time.

21. A computer program product comprising a non-transitory computer usable medium including a computer readable program, wherein the computer readable program when executed on a computer causes the computer to:

detect a provisioning trigger event;

determine a state of a journey associated with a user based on the provisioning trigger event;

receive contact data describing one or more contacts associated with the user;

receive social graph data describing a social graph associated with the user;

receive location data associated with the user;

populate a contact vocabulary associated with the user based on the contact data, the social graph data, contact information associated with the location data and the state of the journey;

compute a quality score for each contact term the contact vocabulary includes based on a relationship between the user and a contact represented by the contact term;
compare the quality score of each contact term to a quality threshold;
retain each contact term whose quality score satisfies the quality threshold and removing each contact term whose quality score does not satisfy the quality threshold to create a filtered contact vocabulary that includes custom contact terms;
register the filtered contact vocabulary for the user;
receive a speech command from the user;
recognize one or more custom contact terms in the speech command based on the registered contact vocabulary;
send data describing the speech command that includes the one or more custom contact terms; and
receive a result that matches the speech command including the one or more custom contact terms.

22. A computer program product comprising a non-transitory computer usable medium including a computer readable program, wherein the computer readable program when executed on a computer causes the computer to:
detect a provisioning trigger event;
determine a state of a journey associated with a user based on the provisioning trigger event;
receive content data describing one or more content items;
receive data describing one or more content sources;
populate a content vocabulary associated with a user based on the content data, the one or more content sources and the state of the journey;
compute a quality score for each content term the content vocabulary includes based on an interaction of the user with a content item represented by the content term;
compare the quality score of each content term to a quality threshold;
retain each content term whose quality score satisfies the quality threshold and remove each content term whose quality score does not satisfy the quality threshold to create a filtered content vocabulary that includes custom content terms;
register the filtered content vocabulary for the user;
receive a speech command from the user;
recognize one or more custom content terms in the speech command based on the registered content vocabulary;
send data describing the speech command that includes the one or more custom content terms; and
receive a result that matches the speech command including the one or more custom content terms.

23. A system comprising:
a processor; and
a memory storing instructions that, when executed, cause the system to:
detect a provisioning trigger event;
determine a state of a journey associated with a user based on the provisioning trigger event;
determine one or more interest places based on the state of the journey;
populate a place vocabulary associated with the user using the one or more interest places;
filter the place vocabulary based on one or more place filtering parameters including a first location associated with the user, to filter the place vocabulary including determining a size of the place vocabulary, configuring a size of a coverage range associated with the first location based on the size of the place vocabulary, and generating the filtered place vocabulary that includes one or more custom place terms corresponding to one or more second locations within the coverage range;
register the filtered place vocabulary for the user;
receive a speech command from the user;
recognize the one or more custom place terms in the speech command based on the registered place vocabulary;
send data describing the speech command that includes the one or more custom place terms; and
receive a result that matches the speech command including the one or more custom place terms.

24. The system of claim 23, wherein
the filtered place vocabulary is registered with a speech engine,
the speech command is received from the user via a microphone associated with a computing device and coupled to the speech engine,
the data describing the speech command is sent to the speech engine,
the result that matches the speech command is received from the speech engine, and
the instructions when executed cause the system to also:
provide the result to the user via an output device associated with the computing device.

25. The system of claim 23, wherein the instructions when executed cause the system to also:
receive navigation data associated with a user;
process the navigation data to identify a travel route and one or more stop points;
determine one or more road names associated with the travel route;
determine one or more landmarks associated with the travel route; and
populate the place vocabulary further based on the one or more landmarks and the one or more road names.

26. The system of claim 23, wherein the instructions when executed cause the system to also:
receive social network data associated with the user; and
determine the one or more interest places further based on location data included in the social network data.

27. The system of claim 26, wherein the instructions when executed cause the system to also:
receive search data associated with the user; and
determine the one or more interest places further based on the search data.

28. The system of claim 23, wherein the instructions when executed cause the system to also:
receive contacts data associated with the user; and
determine the one or more interest places further based on location data in the contacts data.

29. The system of claim 28, wherein the instructions when executed cause the system to also:
receive search data associated with the user; and
determine the one or more interest places further based on the search data.

30. The system of claim 23, wherein the instructions when executed cause the system to also:
receive search data associated with the user; and
determine the one or more interest places further based on the search data.

31. The system of claim 23, wherein:
the journey includes a future journey;
the state of the journey includes a journey start time for the future journey; and
the place vocabulary is populated and registered before the journey start time.

32. A system comprising:
a processor; and
a memory storing instructions that, when executed, cause the system to:
- detect a provisioning trigger event;
- determine a state of a journey associated with a user based on the provisioning trigger event;
- receive contact data describing one or more contacts associated with the user;
- receive social graph data describing a social graph associated with the user;
- receive location data associated with the user;
- populate a contact vocabulary associated with the user based on the contact data, the social graph data, contact information associated with the location data and the state of the journey;
- compute a quality score for each contact term the contact vocabulary includes based on a relationship between the user and a contact represented by the contact term;
- compare the quality score of each contact term to a quality threshold;
- retain each contact term whose quality score satisfies the quality threshold and removing each contact term whose quality score does not satisfy the quality threshold to create a filtered contact vocabulary that includes custom contact terms;
- register the filtered contact vocabulary for the user;
- receive a speech command from the user;
- recognize one or more custom contact terms in the speech command based on the registered contact vocabulary;
- send data describing the speech command that includes the one or more custom contact terms; and
- receive a result that matches the speech command including the one or more custom contact terms.

33. A system comprising:
a processor; and
a memory storing instructions that, when executed, cause the system to:
- detect a provisioning trigger event;
- determine a state of a journey associated with a user based on the provisioning trigger event;
- receive content data describing one or more content items;
- receive data describing one or more content sources;
- populate a content vocabulary associated with a user based on the content data, the one or more content sources and the state of the journey;
- compute a quality score for each content term the content vocabulary includes based on an interaction of the user with a content item represented by the content term;
- compare the quality score of each content term to a quality threshold;
- retain each content term whose quality score satisfies the quality threshold and remove each content term whose quality score does not satisfy the quality threshold to create a filtered content vocabulary that includes custom content terms;
- register the filtered content vocabulary for the user;
- receive a speech command from the user;
- recognize one or more custom content terms in the speech command based on the registered content vocabulary;
- send data describing the speech command that includes the one or more custom content terms; and
- receive a result that matches the speech command including the one or more custom content terms.

* * * * *